US012776105B2

(12) United States Patent
Ullal et al.

(10) Patent No.: US 12,776,105 B2
(45) Date of Patent: Oct. 27, 2026

(54) SYSTEM AND METHOD FOR EFFICIENT MAPPING OF USER LOCOMOTION BETWEEN REMOTE AND LOCAL ENVIRONMENTS IN AUGMENTED REALITY

(71) Applicant: Vanderbilt University, Nashville, TN (US)

(72) Inventors: Akshith Ullal, Nashville, TN (US); Nilanjan Sarkar, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 277 days.

(21) Appl. No.: 18/522,027

(22) Filed: Nov. 28, 2023

(65) Prior Publication Data

US 2024/0177426 A1 May 30, 2024

Related U.S. Application Data

(60) Provisional application No. 63/385,190, filed on Nov. 28, 2022.

(51) Int. Cl.

| | |
|---|---|
| ***G06T 19/00*** | (2011.01) |
| ***G02B 27/01*** | (2006.01) |
| ***G06F 3/01*** | (2006.01) |
| ***G06T 13/40*** | (2011.01) |
| ***G06V 10/764*** | (2022.01) |

(52) U.S. Cl.

CPC ........ *G06T 19/003* (2013.01); *G02B 27/0172* (2013.01); *G06F 3/011* (2013.01); *G06T 13/40* (2013.01); *G06T 19/006* (2013.01); *G06V 10/764* (2022.01)

(58) Field of Classification Search

None

See application file for complete search history.

(56) References Cited

U.S. PATENT DOCUMENTS

| | | | | |
|---|---|---|---|---|
| 2003/0202120 | A1* | 10/2003 | Mack | H04N 5/2224 348/E5.022 |
| 2018/0033190 | A1* | 2/2018 | Ma | G06T 13/40 |
| 2018/0122138 | A1* | 5/2018 | Piya | G06F 30/00 |
| 2019/0287293 | A1* | 9/2019 | Steinbach | G06V 20/10 |
| 2020/0151961 | A1* | 5/2020 | Viner | G06F 3/011 |
| 2023/0055013 | A1* | 2/2023 | Venturini | G06V 10/44 |

OTHER PUBLICATIONS

Park, Jongho, and Youdan Kim. "Real-time collision avoidance control of quadrotor using ellipsoid as a bounding box. " 2016 European Control Conference (ECC). IEEE, 2016. (Year: 2016).*

"Azure Kinect DK," https://azure.microsoft.com/enus/ services/ kinect-dk/.

(Continued)

*Primary Examiner* — Yi Wang

(74) *Attorney, Agent, or Firm* — MICHAEL BEST & FRIEDRICH LLP

(57) ABSTRACT

A framework that incorporates a locomotion redirection process for finding mappings between two environments that satisfy differences in room geometry and obstacle distributions to determine walkable paths while ensuring the determined paths obey naturalistic walking constraints.

20 Claims, 18 Drawing Sheets
(17 of 18 Drawing Sheet(s) Filed in Color)

(a) (b)

(56) References Cited

OTHER PUBLICATIONS

"Azure Kinect Examples for Unity." [Online]. Version Accessed Oct. 2, 2022. Available: https://web.archive.org/web/20221002150707/https://assetstore.unity.com/packages/tools/integration/azure-kinect-examples-for-unity-149700 (1 page).
Abbott, P. (2008). On the perimeter of an ellipse. Mathematica Journal, 11(2), 172.
Achilleos, A. P., et al. (Jun. 2013). Developing an effective social presence system for older adults: The connected vitality network. In Proceedings of the ITI 2013 35th International Conference on Information Technology Interfaces (pp. 153-159). IEEE.
Agethen, P., et al. (Nov. 2018). Towards realistic walk path simulation of single subjects: Presenting a probabilistic motion planning algorithm. In Proceedings of the 11th ACM SIGGRAPH Conference on Motion, Interaction and Games (pp. 1-10).
Alem, L., et al. (2011). HandsOnVideo: Towards a gesture based mobile AR system for remote collaboration. In Recent trends of mobile collaborative augmented reality systems (pp. 135-148). New York, NY: Springer New York.
Amis, J. M., et al. Organisational change in a (post-) pandemic world: Rediscovering interests and values. Journal of Management Studies. J. Manag. Stud., vol. 58, No. 2, pp. 582-586, 2021.
Aravind, G., et al. (2014). Virtual reality-based navigation task to reveal obstacle avoidance performance in individuals with visuospatial neglect. IEEE Transactions on Neural Systems and Rehabilitation Engineering, 23(2), 179-188.
Aristidou, A., et al. (2016). Extending FABRIK with model constraints. Computer Animation and Virtual Worlds, 27(1), 35-57.
Aristidou, A. et al. "Fabrik: A fast, iterative solver for the Inverse Kinematics problem." Graphical Models 73.5 (2011): 243-260.
Atkinson, A. et al. "Evidence for distinct contributions of form and motion information to the recognition of emotions from body gestures." Cognition 104.1 (2007): 59-72.
Ayyanchira, A., et al. (2022). Toward cross-platform immersive visualization for indoor navigation and collaboration with augmented reality. Journal of Visualization, 25(6), 1249-1266.
Azmandian, M., et al. (2017, March). An evaluation of strategies for two-user redirected walking in shared physical spaces. In 2017 IEEE Virtual Reality (VR) (pp. 91-98). IEEE.
Babapour Chafi, M., et al. (2021). Post-pandemic office work: Perceived challenges and opportunities for a sustainable work environment. Sustainability, 14(1), 294.
Bailenson J.N. , "Nonverbal overload: A theoretical argument for the causes of Zoom fatigue," 2021.
Bailenson, J. N., et al. (2005). The independent and interactive effects of embodied-agent appearance and behavior on self-report, cognitive, and behavioral markers of copresence in immersive virtual environments. Presence, 14(4), 379-393.
Bauer, M. (2007). Tracking errors in augmented reality (Doctoral dissertation, Technische Universität München). 166 pages.
Beeson, P., et al. (Nov. 2015). TRAC-IK: An open-source library for improved solving of generic inverse kinematics. In 2015 IEEE-RAS 15th International Conference on Humanoid Robots (Humanoids) (pp. 928-935). IEEE.
Bern, M., et al. (1995). Mesh generation and optimal triangulation. In Computing in Euclidean geometry (pp. 47-123).
Beyan, C., et al. (2021). Modeling multiple temporal scales of full-body movements for emotion classification. IEEE Transactions on Affective Computing.
Beyan, C., et al. (Oct. 2017). Moving as a leader: Detecting emergent leadership in small groups using body pose. In Proceedings of the 25th ACM international conference on Multimedia (pp. 1425-1433).
Bhattacharyya, P., et al. (May 2019). Brick: Toward a model for designing synchronous colocated augmented reality games. In Proceedings of the 2019 CHI Conference on Human Factors in Computing Systems (pp. 1-9).
Biocca, F., et al. (2003). Toward a more robust theory and measure of social presence: Review and suggested criteria. Presence: Teleoperators & virtual environments, 12(5), 456-480.
Bloise, N., et al. (2017). Obstacle avoidance with potential field applied to a rendezvous maneuver. Applied Sciences, 7(10), 1042.
Bohannon, R. W. (1997). Comfortable and maximum walking speed of adults aged 20-79 years: reference values and determinants. Age and ageing, 26(1), 15-19.
Borenstein, J., et al. (1991). The vector field histogram-fast obstacle avoidance for mobile robots. IEEE transactions on robotics and automation, 7(3), 278-288.
Borghese, N. A., et al. (1996). Kinematic determinants of human locomotion. The Journal of physiology, 494(3), 863-879.
Brogan, D. C., et al. (May 2003). Realistic human walking paths. In Proceedings 11th IEEE International Workshop on Program Comprehension (pp. 94-101). IEEE.
Budiyanto, A., et al. (Aug. 2015). UAV obstacle avoidance using potential field under dynamic environment. In 2015 International Conference on Control, Electronics, Renewable Energy and Communications (ICCEREC) (pp. 187-192). IEEE.
Campbell, S. et al. "Path planning techniques for mobile robots a review," in 2020 6th International Conference on Mechatronics and Robotics Engineering (ICMRE), 2020, pp. 12-16.
Canutescu, A. A., et al. (2003). Cyclic coordinate descent: A robotics algorithm for protein loop closure. Protein science, 12(5), 963-972.
Chandrupatla, T. R., et al. (2010). The perimeter of an ellipse. Mathematical Scientist, 35(2).
Chen, C., et al. (2010). Learning a 3D human pose distance metric from geometric pose descriptor. IEEE transactions on visualization and computer graphics, 17(11), 1676-1689.
Chen, C., et al. (2009). Perceptual 3D pose distance estimation by boosting relational geometric features. Computer Animation and Virtual Worlds, 20(2-3), 267-277.
Chen, H., et al. (Mar. 2018). Redirected walking in irregularly shaped physical environments with dynamic obstacles. In 2018 IEEE Conference on Virtual Reality and 3D User Interfaces (VR) (pp. 523-524). IEEE.
Chen, Y., et al. (Apr. 2020). Understanding viewport-and world-based pointing with everyday smart devices in immersive augmented reality. In Proceedings of the 2020 CHI Conference on Human Factors in Computing Systems (pp. 1-13).
Chi, K. H., et al. (Apr. 2011). Obstacle avoidance in mobile robot using neural network. In 2011 International Conference on Consumer Electronics, Communications and Networks (CECNet) (pp. 5082-5085). IEEE.
Choi, K. J., et al. (2000). Online motion retargetting. The Journal of Visualization and Computer Animation, 11(5), 223-235.
Choset, H., et al. (May 1995). Sensor based planning. I. The generalized Voronoi graph. In Proceedings of 1995 IEEE international conference on robotics and automation (vol. 2, pp. 1649-1655). IEEE.
Coleman, D. M., et al. (Mar. 2008). O3: An optimal and opportunistic path planner (with obstacle avoidance) using voronoi polygons. In 2008 10th IEEE International Workshop on Advanced Motion Control (pp. 371-376). IEEE.
Collins, T., et al. (2016). PASO: an integrated, scalable PSO-based optimization framework for hyper-redundant manipulator path planning and inverse kinematics. Information Sciences Institute Technical Report.
Costa, N. R., et al. (2010). Multiple response optimization: a global criterion-based method. Journal of chemometrics, 24(6), 333-342.
Cowell, A. J., et al. (2005). Manipulation of non-verbal interaction style and demographic embodiment to increase anthropomorphic computer character credibility. International journal of human-computer studies, 62(2), 281-306.
Crum, W. R., et al. (2004). Non-rigid image registration: theory and practice. The British journal of radiology, 77(suppl_2), S140-S153.
Dinas, S., et al. (2014). A review on Delaunay triangulation with application on computer vision. Int. J. Comput. Sci. Eng, 3, 9-18.
Dong, Z. C., et al. (2019). Redirected smooth mappings for multiuser real walking in virtual reality. ACM Transactions on Graphics (TOG), 38(5), 1-17.

(56) References Cited

OTHER PUBLICATIONS

Ekman, P., et al. (1967). Head and body cues in the judgment of emotion: A reformulation. Perceptual and motor skills, 24(3), 711-724.
Elvezio, C., et al. (Oct. 2018). Collaborative virtual reality for low-latency interaction. In Adjunct Proceedings of the 31st Annual ACM Symposium on User Interface Software and Technology (pp. 179-181).
Evangelista Belo, J. M., et al. (May 2021). XRgonomics: facilitating the creation of ergonomic 3D interfaces. In Proceedings of the 2021 CHI Conference on Human Factors in Computing Systems (pp. 1-11).
Everett, A. Benefits and challenges of fun in the workplace. Library Leadership & Management, 25(1)., pp. 1-10, 2011.
Falconi, R., et al. (2014). Inverse kinematics of serial manipulators in cluttered environments using a new paradigm of particle swarm optimization. IFAC Proceedings vols. 47(3), 8475-8480.
Fan, J., et al. (2021). SAR-connect: a socially assistive robotic system to support activity and social engagement of older adults. IEEE Transactions on Robotics, 38(2), 1250-1269.
Fan, J., et al. (2021). Field testing of Ro-Tri, a robot-mediated triadic interaction for older adults. International Journal of Social Robotics, 13, 1711-1727.
Faul, F., et al. (2007). G* Power 3: A flexible statistical power analysis program for the social, behavioral, and biomedical sciences. Behavior research methods, 39(2), 175-191.
Floater, M. S., et al. (2005). Surface parameterization: a tutorial and survey. Advances in multiresolution for geometric modelling, 157-186.
Gamelin, G., et al. (2021). Point-cloud avatars to improve spatial communication in immersive collaborative virtual environments. Personal and Ubiquitous Computing, 25, 467-484.
Geerse, D. J., et al. (2020). Quantifying spatiotemporal gait parameters with HoloLens in healthy adults and people with Parkinson's disease: Test-retest reliability, concurrent validity, and face validity. Sensors, 20(11), 3216.
Gibson, A., et al. (2018). Evaluation of a visual-tactile multimodal display for surface obstacle avoidance during walking. IEEE Transactions on Human-Machine Systems, 48(6), 604-613.
Gonzalez, E. J., et al. (Apr. 2022). A Model Predictive Control Approach for Reach Redirection in Virtual Reality. In Proceedings of the 2022 CHI Conference on Human Factors in Computing Systems (pp. 1-15).
Hale, J., et al. (2016). Testing the relationship between mimicry, trust and rapport in virtual reality conversations. Scientific reports, 6(1), 35295.
Han, W. G., et al. (Oct. 1997). Genetic algorithm based path planning and dynamic obstacle avoidance of mobile robots. In 1997 IEEE International Conference on Systems, Man, and Cybernetics. Computational Cybernetics and Simulation (vol. 3, pp. 2747-2751). IEEE.
Hang, S. (2015). TetGen, a Delaunay-based quality tetrahedral mesh generator. ACM Trans. Math. Softw, 41(2), 11.
Harada, T., et al. (Nov. 2004). Quantitative evaluation method for pose and motion similarity based on human perception. In 4th IEEE/RAS International Conference on Humanoid Robots, 2004. (vol. 1, pp. 494-512). IEEE.
He, Z., et al. (Nov. 2020). Collabovr: A reconfigurable framework for creative collaboration in virtual reality. In 2020 IEEE International Symposium on Mixed and Augmented Reality (ISMAR) (pp. 542-554). IEEE.
Henk M., "Löwner-John Ellipsoids," Optim. Stories, Doc. Math., vol. I, No. 2012, pp. 95-106, 2012.
Henrikson, R., et al. (2020, April). Head-coupled kinematic template matching: A prediction model for ray pointing in vr. In Proceedings of the 2020 CHI Conference on Human Factors in Computing Systems (pp. 1-14).
Hirt, C., et al. (2018). Geometry extraction for ad hoc redirected walking using a SLAM device. In Augmented Reality, Virtual Reality, and Computer Graphics: 5th International Conference, AVR 2018, Otranto, Italy, Jun. 24-27, 2018, Proceedings, Part I 5 (pp. 35-53). Springer International Publishing.
Ho, E. S., et al. (2009). Indexing and retrieving motions of characters in close contact. IEEE Transactions on Visualization and Computer Graphics, 15(3), 481-492.
Hoffmann, C., et al. (2020). Impact of augmented reality guidance for car repairs on novice users of AR: a field experiment on familiar and unfamiliar tasks. In Proceedings of Mensch und Computer 2020 (pp. 279-289).
Hoppe, A. H., et al. (Mar. 2018). Personal perspective: Using modified world views to overcome real-life limitations in virtual reality. In 2018 IEEE Conference on Virtual Reality and 3D User Interfaces (VR) (pp. 577-578). IEEE.
Hoppe, A. H., et al. (2021). Shisha: Enabling shared perspective with face-to-face collaboration using redirected avatars in virtual reality. Proceedings of the ACM on Human-Computer Interaction, 4(CSCW3), 1-22.
Hubenschmid, S. et al. 2021. Stream: Exploring the combination of spatially-aware tablets with augmented reality head-mounted displays for immersive analytics. In Proceedings of the 2021 CHI Conference on Human Factors in Computing Systems, 1-14.
Hung, H., et al. (2010). Estimating cohesion in small groups using audio-visual nonverbal behavior. IEEE Transactions on Multimedia, 12(6), 563-575.
Hutton, C., et al. (Mar. 2016). A realistic walking model for enhancing redirection in virtual reality. In 2016 IEEE Virtual Reality (VR) (pp. 183-184). IEEE.
Ibáñez, M. B., et al. (2018). Augmented reality for STEM learning: A systematic review. Computers & Education, 123, 109-123.
Igarashi, T., et al. (2005). As-rigid-as-possible shape manipulation. ACM transactions on Graphics (TOG), 24(3), 1134-1141.
Jang, S., et al. (Oct. 2014). GestureAnalyzer: visual analytics for pattern analysis of mid-air hand gestures. In Proceedings of the 2nd ACM symposium on Spatial user interaction (pp. 30-39).
Jin, T., et al. (May 2018). Aura mesh: Motion retargeting to preserve the spatial relationships between skinned characters. In Computer Graphics Forum (vol. 37, No. 2, pp. 311-320).
Jo, D., et al. (2019). AR enabled IoT for a smart and interactive environment: A survey and future directions. Sensors, 19(19), 4330.
Jo, D., et al. (2015). SpaceTime: adaptive control of the teleported avatar for improved AR tele-conference experience. Computer Animation and Virtual Worlds, 26(3-4), 259-269.
John, B., et al. (2020). A review of mixed reality in Health Care. Delivering Superior Health and Wellness Management with IoT and Analytics, 375-382.
Joly, H. "Lead your team into a post-pandemic world," Harvard Bus. Rev. https//hbr. org/2020/05/lead-your-team-into-a-post-pandemic-world, 2020.
Jung, I. K., et al. (Jul. 1999). Path planning of mobile robot using neural network. In ISIE'99. Proceedings of the IEEE International Symposium on Industrial Electronics (Cat. No. 99TH8465) (vol. 3, pp. 979-983). IEEE.
Kanamori, K., et al. (Oct. 2018). Obstacle avoidance method in real space for virtual reality immersion. In 2018 IEEE International Symposium on Mixed and Augmented Reality (ISMAR) (pp. 80-89). IEEE.
Kane, G. C., et al. (2021). Redesigning the post-pandemic workplace. MIT Sloan Management Review, 62(3), 12- 14.
Kang, H., et al. (Oct. 2019). SafeAR: AR alert system assisting obstacle avoidance for pedestrians. In 2019 IEEE International Symposium on Mixed and Augmented Reality Adjunct (ISMAR-Adjunct) (pp. 81-82). IEEE.
Kaushik, R., et al. (2018). Imitating human movement using a measure of verticality to animate low degree-of-freedom non-humanoid virtual characters. In Social Robotics: 10th International Conference, ICSR 2018, Qingdao, China, Nov. 28-30, 2018, Proceedings 10 (pp. 588-598). Springer International Publishing.
Kenwright, B. (2022). Real-time character inverse kinematics using the gauss-seidel iterative approximation method. arXiv preprint arXiv:2211.00330.
Keshavarzi, M., et al. (Mar. 2020). Optimization and manipulation of contextual mutual spaces for multi-user virtual and augmented

(56) References Cited

OTHER PUBLICATIONS reality interaction. In 2020 IEEE conference on virtual reality and 3D user interfaces (VR) (pp. 353-362). IEEE.
Khatib, O. (Mar. 1985). Real-time obstacle avoidance for manipulators and mobile robots. In Proceedings. 1985 IEEE international conference on robotics and automation (vol. 2, pp. 500-505). IEEE.
Kim, C. J., et al. (2014). Obstacle avoidance method for wheeled mobile robots using interval type-2 fuzzy neural network. IEEE Transactions on Fuzzy Systems, 23(3), 677-687.
Kim, T., et al. (Mar. 2016). Redirected head gaze to support ar meetings distributed over heterogeneous environments. In 2016 IEEE Virtual Reality (VR) (pp. 207-208). IEEE.
Kim, Y. et al. 2016. Retargeting human-object interaction to virtual avatars. IEEE transactions on visualization and computer graphics. 22, 11 (2016), 2405-2412.
Kleinsmith, A., et al. (2012). Affective body expression perception and recognition: A survey. IEEE Transactions on Affective Computing, 4(1), 15-33.
Kobayashi, F., et al. (Aug. 2003). Re-formation of mobile robots using genetic algorithm and reinforcement learning. In SICE 2003 Annual Conference (IEEE Cat. No. 03TH8734) (vol. 3, pp. 2902-2907). IEEE.
Kohli, L. (2013). Redirected touching (Doctoral dissertation, The University of North Carolina at Chapel Hill).
Kreijns, K., et al. (2022). Social presence: Conceptualization and measurement. Educational Psychology Review, 34(1), 139-170.
Kulpa, R., et al. (Dec. 2005). Fast inverse kinematics and kinetics solver for human-like figures. In 5th IEEE-RAS International Conference on Humanoid Robots, 2005. (pp. 38-43). IEEE.
Kunz, T., et al. (2011). Turning paths into trajectories using parabolic blends. Georgia Institute of Technology.
Kwan, K. C., et al. (May 2019). Mobi3dsketch: 3d sketching in mobile ar. In Proceedings of the 2019 CHI Conference on Human Factors in Computing Systems (pp. 1-11).
Lapointe, J. F., et al. (2020). A literature review of AR-based remote guidance tasks with user studies. In Virtual, Augmented and Mixed Reality. Industrial and Everyday Life Applications: 12th International Conference, VAMR 2020, Held as Part of the 22nd HCI International Conference, HCII 2020, Copenhagen, Denmark, Jul. 19-24, 2020, Proceedings, Part II 22 (pp. 111-120). Springer International Publishing.
Lasserre, J. B. (2015). A generalization of Löwner-John's ellipsoid theorem. Mathematical Programming, 152, 559-591.
Lee et al. "Automatic path generation for group dance performance using a genetic algorithm," Multimed. Tools Appl., vol. 78, No. 6, pp. 7517-7541 (2019).
Lee S. et al. "Projective Motion Correction with Contact Optimization," IEEE Trans. Vis. Comput. Graph., vol. 25, No. 4, pp. 1746-1759, 2018.
Lee, J., et al. (Jul. 1999). A hierarchical approach to interactive motion editing for human-like figures. In Proceedings of the 26th annual conference on Computer graphics and interactive techniques (pp. 39-48).
Lee, J., et al. (Jul. 2002). Interactive control of avatars animated with human motion data. In Proceedings of the 29th annual conference on Computer graphics and interactive techniques (pp. 491-500).
Lelas, J. L., et al. (2003). Predicting peak kinematic and kinetic parameters from gait speed. Gait & posture, 17(2), 106-112.
Li, H. et al. 2008. Global correspondence optimization for non-rigid registration of depth scans. Computer graphics forum (2008), 1421-1430.
Li, T. H. S., et al. (2010). Walking motion generation, synthesis, and control for biped robot by using PGRL, LPI, and fuzzy logic. IEEE Transactions on Systems, Man, and Cybernetics, Part B (Cybernetics), 41(3), 736-748.
Lindlbauer, D., et al. (Apr. 2018). Remixed reality: Manipulating space and time in augmented reality. In Proceedings of the 2018 CHI Conference on Human Factors in Computing Systems (pp. 1-13).
Lindlbauer, D., et al. (Oct. 2019). Context-aware online adaptation of mixed reality interfaces. In Proceedings of the 32nd annual ACM symposium on user interface software and technology (pp. 147-160).
Liu, Y., et al. (Jul. 2020). On the normalization in evolutionary multi-modal multi-objective optimization. In 2020 IEEE Congress on Evolutionary Computation (CEC) (pp. 1-8). IEEE.
Maas, M. J., et al. (2020). Virtual, augmented and mixed reality in K-12 education: A review of the literature. Technology, Pedagogy and Education, 29(2), 231-249.
Mackenzie S.H. et al, "Adventure in the age of COVID-19: Embracing microadventures and locavism in a post-pandemic world," Leis. Sci., vol. 43, No. 1-2, pp. 62-69, 2020.
Malathi, S et al. "Building and Deploying a Static Application using Jenkins and Docker in AWS," Int. J. Trend Sci. Res. Dev., vol. 4, No. 4, pp. 16-18, 2020.
Marc, A. (2000). As-rigid-as-possible Shape Interpolation. In Proceedings of the 27th annual conference on Computer graphics and interactive techniques, 2000., pp. 157-164.
Marler, R. T., et al. (2004). Survey of multi-objective optimization methods for engineering. Structural and multidisciplinary optimization, 26, 369-395.
Maroger, I., et al. (Oct. 2020). Walking human trajectory models and their application to humanoid robot locomotion. In 2020 IEEE/RSJ International Conference on Intelligent Robots and Systems (IROS) (pp. 3465-3472). IEEE.
Maturana, B. et al. "Architecture, urbanism and health in a post-pandemic virtual world." Archnet-IJAR: International Journal of Architectural Research 15.1 (2021): 1-9.
Mille, M. L., et al. (1998). Are human anticipatory postural adjustments affected by a modification of the initial position of the center of gravity ?. Neuroscience letters, 242(2), 61-64.
Mori, M., et al. (2012). The uncanny valley [from the field]. IEEE Robotics & automation magazine, 19(2), 98-100.
Narang, S et al. "Simulating movement interactions between avatars & agents in virtual worlds using human motion constraints," in 2018 IEEE Conference on Virtual Reality and 3D User Interfaces (VR), 2018, pp. 9-16.
Nebeling, M., et al. (Apr. 2020). XRDirector: A role-based collaborative immersive authoring system. In Proceedings of the 2020 CHI Conference on Human Factors in Computing Systems (pp. 1-12).
Norman, M., et al. (Mar. 2019). A mixed presence collaborative mixed reality system. In 2019 IEEE Conference on Virtual Reality and 3D User Interfaces (VR) (pp. 1106-1107). IEEE.
Oh, C. S., et al. (2018). A systematic review of social presence: Definition, antecedents, and implications. Frontiers in Robotics and AI, 5, 409295.
Pandey, A., et al. (2017). Mobile robot navigation and obstacle avoidance techniques: A review. Int Rob Auto J, 2(3), 00022.
Park, D. H., et al. (Dec. 2008). Movement reproduction and obstacle avoidance with dynamic movement primitives and potential fields. In Humanoids 2008-8th IEEE-RAS International Conference on Humanoid Robots (pp. 91-98). IEEE.
Park, S. I., et al. (2004). On-line motion blending for real-time locomotion generation. Computer Animation and Virtual Worlds, 15(3-4), 125-138.
Pejsa, T., et al. (Feb. 2016). Room2room: Enabling life-size telepresence in a projected augmented reality environment. In Proceedings of the 19th ACM conference on computer-supported cooperative work & social computing (pp. 1716-1725).
Persson, P. O., et al. (2004). A simple mesh generator in MATLAB. SIAM review, 46(2), 329-345.
Pfeuffer, K., et al. (2021). ARtention: A design space for gaze-adaptive user interfaces in augmented reality. Computers & Graphics, 95, 1-12.
Pfeuffer, K., et al. (May 2019). Behavioural biometrics in VR: Identifying people from body motion and relations in virtual reality. In Proceedings of the 2019 CHI Conference on Human Factors in Computing Systems (pp. 1-12).
Pinkall, U., et al. (1993). Computing discrete minimal surfaces and their conjugates. Experimental mathematics, 2(1), 15-36.

(56) References Cited

OTHER PUBLICATIONS

Piumsomboon, T., et al. (Oct. 2017). [poster] covar: Mixed-platform remote collaborative augmented and virtual realities system with shared collaboration cues. In 2017 IEEE International Symposium on Mixed and Augmented Reality (ISMAR-Adjunct) (pp. 218-219). IEEE.
Piumsomboon, T., et al. (Apr. 2018). Mini-me: An adaptive avatar for mixed reality remote collaboration. In Proceedings of the 2018 CHI conference on human factors in computing systems (pp. 1-13).
Plasson, C., et al. (Nov. 2019). Tabletop ar with hmd and tablet: a comparative study for 3D selection. In Proceedings of the 2019 ACM International Conference on Interactive Surfaces and Spaces (pp. 409-414).
Radu, I., et al. (2021). Unequal impacts of augmented reality on learning and collaboration during robot programming with peers. Proceedings of the ACM on Human-Computer Interaction, 4(CSCW3), 1-23.
Razzaque S. et al., Redirected walking. The University of North Carolina at Chapel Hill, 2005.
Ren, J., et al. (Jun. 2010). Simulation of virtual human running based on inverse kinematics. In 2010 2nd International Conference on Education Technology and Computer (vol. 3, pp. V3-360). IEEE.
Roether, C. L., et al. (2009). Critical features for the perception of emotion from gait. Journal of vision, 9(6), 15-15.
Roth, D., et al. (Mar. 2016). A simplified inverse kinematic approach for embodied VR applications. In 2016 IEEE Virtual Reality (VR) (pp. 275-276). IEEE.
Roth, D., et al. (Oct. 2018). Injecting nonverbal mimicry with hybrid avatar-agent technologies: A naïve approach. In Proceedings of the 2018 ACM Symposium on Spatial User Interaction (pp. 69-73).
Sanchez-Cortes, D., et al. (2011). A nonverbal behavior approach to identify emergent leaders in small groups. IEEE transactions on multimedia, 14(3), 816-832.
Santi, G. M., et al. (2021). Augmented reality in industry 4.0 and future innovation programs. Technologies, 9(2), 33.
Savage, J., et al. (2013). Obstacle avoidance behaviors for mobile robots using genetic algorithms and recurrent neural networks. IFAC Proceedings vols. 46(24), 141-146.
Schmidt, S et al. "Floor-Projected Guidance Cues for Collaborative Exploration of Spatial Augmented Reality Setups," ISS 2018—Proc. 2018 ACM Int. Conf. Interact. Surfaces Spaces, pp. 279-289, 2018.
Schroeder, R. (2002). Social interaction in virtual environments: Key issues, common themes, and a framework for research. In The social life of avatars: Presence and interaction in shared virtual environments (pp. 1-18). London: Springer London.
Sheffer, A., et al. (2007). Mesh parameterization methods and their applications. Foundations and Trends® in Computer Graphics and Vision, 2(2), 105-171.
Shen, C., et al. (2018). Path-following control of an AUV: A multiobjective model predictive control approach. IEEE Transactions on Control Systems Technology, 27(3), 1334-1342.
So, C. K., et al. (2005). Entropy-based motion extraction for motion capture animation. Computer Animation and Virtual Worlds, 16(3-4), 225-235.
Sorkine, O., et al. (Jul. 2007). As-rigid-as-possible surface modeling. In Symposium on Geometry processing (vol. 4, pp. 109-116).
Sousa, M., et al. (May 2019). Warping deixis: distorting gestures to enhance collaboration. In Proceedings of the 2019 CHI Conference on Human Factors in Computing Systems (pp. 1-12).
Sra, M., et al. (Nov. 2016). Procedurally generated virtual reality from 3D reconstructed physical space. In Proceedings of the 22nd ACM Conference on Virtual Reality Software and Technology (pp. 191-200).
Starke, S. et al. "A Forward Kinematics Data Structure for Efficient Evolutionary Inverse Kinematics," in Computational Kinematics. Springer, 2018, pp. 560-568.
Starke, S. et al. "Memetic Evolution for Generic Full-Body Inverse Kinematics in Robotics and Animation," IEEE Transactions on Evolutionary Computation, vol. 23, No. 3, pp. 406-420, 2019.
Suzanna S. et al. "Immersive Learning by Implementing Augmented Reality: Now and The Future," J. Comput. Sci. Vis. Commun. Des., vol. 6, No. 1, pp. 22-28, 2021.
Tak S. et al. "A physically-based motion retargeting filter," ACM Trans. Graph., vol. 24, No. 1, pp. 98-117, 2005.
Thomas, J., et al. (Mar. 2019). A general reactive algorithm for redirected walking using artificial potential functions. In 2019 IEEE Conference on Virtual Reality and 3D User Interfaces (VR) (pp. 56-62). IEEE.
Thomas, J., et al. (Nov. 2020). Towards physically interactive virtual environments: Reactive alignment with redirected walking. In Proceedings of the 26th ACM Symposium on Virtual Reality Software and Technology (pp. 1-10).
Tomczak M. et al. "The need to report effect size estimates revisited. An overview of some recommended measures of effect size," Trends in Sport Sciences vol. 1, 2014, 19-25.
Ullal, A., et al. (Nov. 2022). Mapping of Locomotion Paths between Remote Environments in Mixed Reality using Mesh Deformation. In Proceedings of the 28th ACM Symposium on Virtual Reality Software and Technology (pp. 1-2).
Ullal, A., et al. (Mar. 2023). A Piecewise Approach to Mapping Interactions between Room-scale Environments in Remote Mixed/Augmented Reality. In 2023 IEEE Conference on Virtual Reality and 3D User Interfaces Abstracts and Workshops (VRW) (pp. 663-664). IEEE.
Ullal, A., et al. (Dec. 2022). A Multi-Objective Optimization Framework for Redirecting Pointing Gestures in Remote-Local Mixed/Augmented Reality. In Proceedings of the 2022 ACM Symposium on Spatial User Interaction (pp. 1-11).
Ullal, A., et al. (2023). An Efficient Redirection of Positional Interactions in Mixed/Augmented Reality. International Journal of Semantic Computing, 17(01), 95-118.
Ullal, A., et al. (Nov. 2021). A Dynamically Weighted Multi-Objective Optimization Approach to Positional Interactions in Remote-Local Augmented/Mixed Reality. In 2021 IEEE International Conference on Artificial Intelligence and Virtual Reality (AIVR) (pp. 29-37). IEEE.
Ungureanu, D., et al. (2020). Hololens 2 research mode as a tool for computer vision research. arXiv preprint arXiv:2008.11239.
Urtasun, R., et al. (Dec. 2004). Style-based motion synthesis. In Computer Graphics Forum (vol. 23, No. 4, pp. 799-812).
Valentini, I., et al. (Mar. 2020). Improving obstacle awareness to enhance interaction in virtual reality. In 2020 IEEE Conference on Virtual Reality and 3D User Interfaces (VR) (pp. 44-52). IEEE.
Villanueva, A., et al. (Apr. 2020). Meta-AR-app: an authoring platform for collaborative augmented reality in STEM classrooms. In Proceedings of the 2020 CHI conference on human factors in computing systems (pp. 1-14).
Wang, J., et al. (Jul. 2003). An evaluation of a cost metric for selecting transitions between motion segments. In Symposium on Computer Animation (vol. 2, No. 3).
Wang, X., et al. (2014). Mutual awareness in collaborative design: An Augmented Reality integrated telepresence system. Computers in industry, 65(2), 314-324.
Wei S.-E. et al., "Vr facial animation via multiview image translation," ACM Trans. Graph., vol. 38, No. 4, pp. 1-16, 2019.
Wen, S. et al. "Elman fuzzy adaptive control for obstacle avoidance of mobile robots using hybrid force/position incorporation," IEEE Trans. Syst. Man, Cybern. Part C (Applications Rev., vol. 42, No. 4, pp. 603-608, 2011.
Wienrich, C., et al. (Mar. 2018). Social presence and cooperation in large-scale multi-user virtual reality-the relevance of social interdependence for location-based environments. In 2018 IEEE Conference on Virtual Reality and 3D User Interfaces (VR) (pp. 207-214). IEEE.
Williams, N. L., et al. (2021). Arc: Alignment-based redirection controller for redirected walking in complex environments. IEEE Transactions on Visualization and Computer Graphics, 27(5), 2535-2544.

(56) References Cited

OTHER PUBLICATIONS

Williams, N. L., et al. (2021). Redirected walking in static and dynamic scenes using visibility polygons. IEEE transactions on visualization and computer graphics, 27(11), 4267-4277.
Winter, D. A. (1995). Human balance and posture control during standing and walking. Gait & posture, 3(4), 193-214.
Wu, F., et al. (Mar. 2019). Combining dynamic field of view modification with physical obstacle avoidance. In 2019 IEEE Conference on Virtual Reality and 3D User Interfaces (VR) (pp. 1882-1883). IEEE.
Yam, C. et al., "Gait recognition by walking and running: a model-based approach," (2002).
Yamane, K., et al. (2003). Natural motion animation through constraining and deconstraining at will. IEEE Transactions on visualization and computer graphics, 9(3), 352-360.
Yamazaki, T. et al. "Human walking motion synthesis based on multiple regression hidden semi-Markov model." In 2005 International Conference on Cyberworlds (CW'05), pp. 8-pp. IEEE, 2005.
Yoon, B., et al. (Mar. 2019). The effect of avatar appearance on social presence in an augmented reality remote collaboration. In 2019 IEEE Conference on Virtual Reality and 3D User Interfaces (VR) (pp. 547-556). IEEE.
Yoon, L., et al. (2020). A mixed reality telepresence system for dissimilar spaces using full-body avatar. In SIGGRAPH Asia 2020 XR (pp. 1-2).
Yoon, L., et al. (2020). Placement retargeting of virtual avatars to dissimilar indoor environments. IEEE Transactions on Visualization and Computer Graphics, 28(3), 1619-1633.
Young, J., et al. (2019). Immersive telepresence and remote collaboration using mobile and wearable devices. IEEE transactions on visualization and computer graphics, 25(5), 1908-1918.
Yu, K., et al. (2021). Avatars for teleconsultation: Effects of avatar embodiment techniques on user perception in 3d asymmetric telepresence. IEEE Transactions on Visualization and Computer Graphics, 27(11), 4129-4139.
Zafar, M. N., et al. (2018). Methodology for path planning and optimization of mobile robots: A review. Procedia computer science, 133, 141-152.
Zhao, J., et al. (1994). Inverse kinematics positioning using nonlinear programming for highly articulated figures. ACM Transactions on Graphics (TOG), 13(4), 313-336.
Zhao, Y., et al. (2018, April). A functional optimization based approach for continuous 3d retargeted touch of arbitrary, complex boundaries in haptic virtual reality. In Proceedings of the 2018 CHI Conference on Human Factors in Computing Systems (pp. 1-12).
Zhao, Z., et al. (Dec. 2019). A live storytelling virtual reality system with programmable cartoon-style emotion embodiment. In 2019 IEEE International Conference on Artificial Intelligence and Virtual Reality (AIVR) (pp. 102-1027). IEEE.
Zhou, D., et al. (2017). Fast, on-line collision avoidance for dynamic vehicles using buffered voronoi cells. IEEE Robotics and Automation Letters, 2(2), 1047-1054.
Zibrek, K., et al. (Sep. 2017). Don't stand so close to me: investigating the effect of control on the appeal of virtual humans using immersion and a proximity-based behavioral task. In Proceedings of the ACM Symposium on Applied Perception (pp. 1-11).
Zibrek, K., et al. (2018). The effect of realistic appearance of virtual characters in immersive environments-does the character's personality play a role ?. IEEE transactions on visualization and computer graphics, 24(4), 1681-1690.

* cited by examiner (b)

(a)

(b)

(a)

(a)

(b)

(a) (b) (c) (d)

(a)

(b)

(b)

(a)

SYSTEM AND METHOD FOR EFFICIENT MAPPING OF USER LOCOMOTION BETWEEN REMOTE AND LOCAL ENVIRONMENTS IN AUGMENTED REALITY

CROSS-REFERENCE TO RELATED APPLICATIONS

This application is a non-provisional of and claims the benefit of U.S. Provisional Patent Application No. 63/385,190, filed on Nov. 28, 2022, the entire contents being incorporated herein by reference.

STATEMENT REGARDING FEDERALLY SPONSORED RESEARCH OR DEVELOPMENT

This invention was made with government support under AG078480 awarded by the National Institutes of Health and 2225890 awarded by the National Science Foundation. The government has certain rights in the invention.

BACKGROUND

During remote interactions using 2D audio-visual applications, the lack of mobility is a big disadvantage when compared to physically present interactions. During physical interactions in the office or workplace, people do not confine themselves to a particular location, but rather they naturally move around, discussing and interacting with their colleague. Instances of such interactions can be seen when people deliberate about ideas in an office setting. Generally, they huddle around a common display element such as a whiteboard or a computer screen, gesturing and moving around it to discuss ideas. Such setups are not only seen in office settings but also during leisure activities and other social gatherings. Examples include, team building activities and games such as Cornhole or Jenga blocks. Such mobility associated interactions cannot be supported by current 2D audio-visual applications. Hence there is a need for information and communications technology (ICT) to be able to support locomotion of the users from remote locations that would be typical of an in-person interaction. Due to the majority of elements being from the real-world environment, among all the extended reality (XR) technologies, augmented reality (AR) is the most viable to simulate naturalistic physical interactions. Modern AR head mounted displays (HMDs) such as HoloLens (HL) and HoloLens2 (HL2) can continuously track the position of the user, in their environment, allowing one to obtain the user's locomotion path. This path can then be followed by the user's avatar in its environment.

However, if the avatar directly follows the walking path of the user in its environment, it may end up at the wrong location to conduct the user's interaction. This is because the environments of the user and their avatar are rarely exactly identical. An example of this scenario is shown in FIG. 1, where FIG. 1 (at a) represents the environment of the user and FIG. 1 (at b) represents the environment of her relative, in this case her grandmother. As observed in these figures, there is a difference in the spatial configuration of the furniture i.e., the placement of the sofas and chairs between the environments. When one of the possible paths the user may take, ABCDE, in her own environment (FIG. 1 (at a)) is directly mapped on to the avatar's environment, the user's avatar will not reach the sofa in its environment but reach the dining chairs. Thus, when the user in FIG. 1 (at a) performs an interaction, for example sits on the sofa, it will result in an erroneous interaction by the avatar as it is not at the sofa's location in its environment. Hence, for the avatar to correctly reach the sofa, an equivalent path A'B'C'D'E' must be determined (FIG. 1 (at b)). The path shown in FIG. 1 is only one of the many paths that the user can take. An equivalent path needs to be obtained in the avatar's environment for any path the user may take in their environment. Although, the avatar's path in its environment needs to be found, path planning algorithms from a traditional robotics perspective are not directly applicable. This is because, in robotic path planning cases, the starting and ending locations of the path are known and the task is to find a viable path in the given environment according to the required optimization objective. In this case, however, this method cannot be applied because the avatar's equivalent path must be determined in real-time with minimum lag as the user walks in their environment. The user could take any path to the sofa and their intended path cannot be known beforehand. In addition, in the robotics problem, the mobile robot/agent moves independently while in the remote/local AR case the avatar always moves in relation to the user and its path is derived from the user it represents.

Accordingly, there is a need to create a mapping between the user's and their avatar's environment in order to obtain the user's equivalent path in the avatar's environment requiring the above situation to be treated as a mapping problem rather than a path planning problem.

SUMMARY

The present disclosure provides a locomotion mapping framework to find equivalent paths between the user's and their avatar's environments and make the user's avatar walk along these paths. The framework also ensures that the avatar's walking satisfies naturalistic locomotion constraints and avoids obstacles in its environment. As used herein an avatar is a photorealistic life-sized virtual representation of a real human, whose body joints and facial features can be custom manipulated.

From a locomotion perspective in a remote/local AR scenario, as shown in FIG. 1, the floorspace can be considered to consist of three elements. First, there are walkable spaces which are locations where the user and the avatar can be present in their respective environments. Second, there could be furniture such as sofas or tables on which virtual objects are placed. These are the objects with which the user or avatar may interact with. Furniture objects may have corresponding equivalence between the user's and the avatar's environments. Finally, there are objects in the environment that can be considered as obstacles, which have no interactive virtual objects on them, and no corresponding equivalence between the environments. The method for dealing with these types of obstacles, such that they can be avoided while obtaining the equivalent path between the environments is described below.

Although mapping of locomotion paths is mainly required for room size environments, it may even be required when mapping user's actions to their avatar in smaller spaces. This is the case, if the distances between the corresponding objects in the user's/avatar's environment are greater than the maximum distance that the user's/avatar's bodily redirection can achieve. Thus, being able to map locomotion paths between environments is a necessity for conducting naturalistic interaction in remote/local AR.

The present disclosure provides a system and method to redirect the locomotion paths of the user and their avatars in multiple environments such that they are spatially and temporarily synchronized and can allow seamless interaction with objects. The frameworks are specifically configured to be applied to room scale environments where obstacles are present and can be scaled easily to environments of any size.

The framework provides the following aspects: a) Applying the idea of mesh deformation techniques in order to obtain equivalent walking paths between two/multiple environments, b) converting interaction redirection in 3d to a 2d piecewise approach of walking components and full body frame redirection that is more computational efficient, c) redirecting the avatar paths around any irregularly shaped obstacles using the minimum area John-Lowner ellipsoid that smoothly redirects the avatars path, d) integrating both the full body and walking redirection frameworks into an overall architecture to perform an interaction seamlessly, and e) iterative architecture of this framework that can be efficiently extended to workspaces of any size.

Additionally, this framework is applicable to any tasks developed in collaborative AR that involves the users moving or walking around in their environment. Activities in collaborative AR that may use locomotion include 1) remote local AR entertainment activities such as games, and the like, 2) remote local AR training or tutorials, 3) transporting remote 3D environments to local environments and vice versa. For example, applications where remote environments are transported to disadvantaged populations where they can move around and interact with the remote environment such as tourist places brought to older adult homes, and 4) AR telepresence and the like.

In one embodiment, the present disclosure provides a system to map the locomotion of a first user and a second user at remote locations interacting in collaborative augmented reality (AR). The system comprises a first head mounted display (HMD) configured to be worn by the first user, the first user positioned within a first environment that includes a first interactable surface and a first obstacle; a second HMD configured to be worn by the second user, the second user positioned within a second environment that includes a second interactable surface and a second obstacle, wherein the second HMD is communicably coupled to the first HMD. The second HMD is configured to generate a path for an avatar of the first user in the second environment by: generating a two-dimensional (2D) spatial mesh of the first environment based on sensor data collected by the first HMD, deforming the 2D spatial mesh of the first environment to a spatial configuration of the second environment to generate an equivalent path in the second environment, taking into account the first interactable surface and the first obstacle in the first environment and the second interactable surface and the second obstacle in the second environment, generating a path through the deformed 2D spatial mesh of the first environment based on the sensor data tracking motion of the first user in the first environment, and providing the path for the avatar of the first user to follow and that can be viewed by the second user through the second HMD.

Other aspects of the disclosure will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
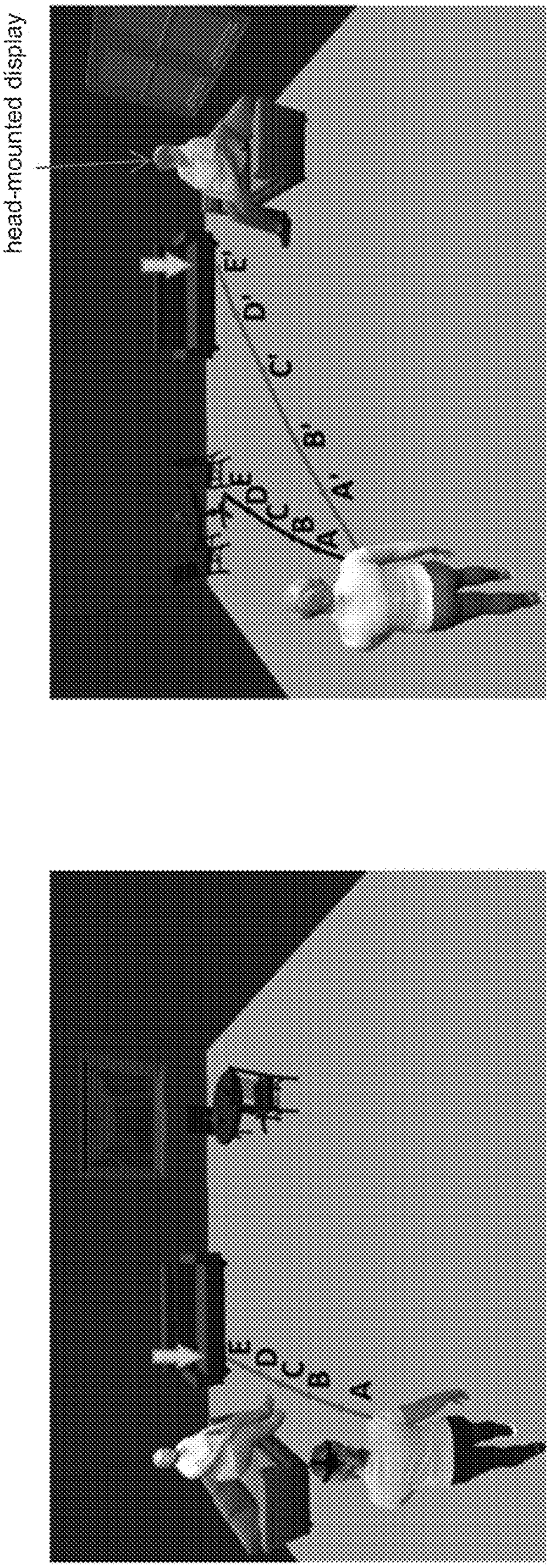
FIG. 1 illustrates a case of equivalent walking paths that need to be generated due to dissimilarities in the granddaughter, User1 and older adult, User2s environments. (a) Represents one of the likely paths User1 may take along vertex points ABCDE to sit on the sofa to chat with User2's avatar in User1's environment. (b) Represents the equivalent path A'B'C'D'E' in User2's environment of the User1's path ABCDE after path deformation to reach the sofa. Note: The equivalent path A'B'C'D'E' is longer and hence the avatars speed in (b) needs to be higher than in (a), to reach the vertex E' as the user in (a) reaches E.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

This disclosure provides a system and method to find a path, that is naturalistic and respects walking constraints between any two points between the users and their avatar's remote environment. The framework, in finding the naturalistic walking paths also solves other related problems. First, whenever an obstacle is present in the equivalent path, the avatars path needs to be redirected around that obstacle. The framework discussed below can do this for any obstacles of any irregular shape in a smooth and naturalistic way. This framework can also be combined with the body gesture redirection framework (described in a separate patent application) to redirect to any desired location between the environments.

In some aspects, the present disclosure provides a framework that incorporates a locomotion redirection process for finding mappings between two environments that satisfy differences in room geometry and obstacle distributions to determine walkable paths while ensuring the determined paths obey naturistic walking constraints. It solves the locomotion redirection problem in 2D where the 3D object meshes are projected on the floor and a walkable path is computed avoiding the boundaries of the obstacles. Meshes are used for tracking the user's locomotion path relative to their environment and can be obtained using a HMD (e.g., HL2). The HMD can include a housing, a controller configured to execute non-transitory computer readable media stored therein, memory, one or more displays, a transmitter and a receiver, electronic communications hardware and software for coupling to and communicating with a network (and other devices), and other relevant electronic circuitry of which a person of skill in the art would understand to be present in a HMD. The controller is configured to execute the frameworks and carry out the methodology described herein.

Mapping of Naturalistic Locomotion Paths Between Local and Remote Environments in Mixed/Augmented Reality

Introduction

Application of redirection techniques used in augmented reality/virtual reality (AR/VR). Redirected walking (RDW) is one of the most well-known applications of mapping a path from one environment to another in VR. RDW allows the user to explore an infinite virtual environment while walking in a finite physical space. It works by applying an imperceptible rotation to the scene, eliciting a user response, making them take a more curved path than they perceive. RDW techniques are generally classified as two types: 1) reactive and 2) predictive. Reactive techniques have no knowledge of the user's intended path in VR and rely on simple heuristics. Examples of these include generalized steering algorithms, such as Steer-To-Center and Steer-To-Orbit, that keep the user away from the physical boundaries by redirecting the user towards or around the center of the environment. Predictive techniques, on the other hand, are a bit more intelligent and have some knowledge of the user's intended virtual path. They have been used for more complex environments such as those with obstacles. These methods include using artificial potential functions, changing the alignment between the VR environment and the real world, and using simultaneous localization and mapping (SLAM) techniques. The techniques of RDW however, cannot be applied to remote/local AR locomotion mapping scenarios, since the user locomotes in both the real and virtual environment as compared to remote/local AR scenarios where the user and avatar are in two distinct environments. RDW also relies on the user changing their path based on perception, which cannot be applied to the avatar in the AR scenario. Other redirection techniques in AR/VR are mainly used when transferring position or motions between entities that are topologically different but overall represent the same abstract concept. For example, transferring the sitting motion of an avatar between furniture of different shapes. In literature the most common entities for which redirections have been used are virtual characters, virtual objects, and different scenes and environments. Redirection techniques have been used to guide physical human-human interactions between virtual characters. This redirection adjusts the motion action according to the dimensions of different virtual characters. However, these works considered the virtual character only in terms of their kinematic structure, but not in terms of the character's skin and overall shape. This is important to preserve the overall semantics of the interaction since virtual characters come in various shapes. This problem has been taken up where a concept of a volumetric mesh has been used to encode the shape of the body and the motion of other characters towards the body. A similar concept has been used for motion retargeting of a user's actions around similar virtual objects in different environments. In terms of room size environments, works have included finding the most similar location for avatar placement between two environments of dissimilar spatial configurations. However, a systematic approach for redirecting a user's locomotion that consider aspects of naturalistic locomotion for room scale environments has not been reported in literature.

Types of placement and redirection techniques used in AR/MR. Before considering redirections involving motion, the techniques used for finding similar positional placement between remote and local environments are described. Positional placement is primarily used for the placement of avatars at appropriate locations between remote and local environments. The most basic of these approaches has been placing avatars on objects between environments whose correspondence has been manually assigned. Such an example would include placing an avatar seated on a sofa from one environment to a sofa in the other environment. Jo et al. "SpaceTime: adaptive control of the teleported avatar for improved AR tele-conference experience," *Comput. Animat. Virtual Worlds*, vol. 26, no. 3-4, pp. 259-269 (2015) went a step further, placing the avatar on the most likely furniture object. The objects between the environments were measured using similarity and matching techniques. Yoon et al. "Placement Retargeting of Virtual Avatars to Dissimilar Indoor Environments," *IEEE Trans. Vis. Comput. Graph.*

(2020) expanded this work by accounting for more aspects of the environment, specifically focusing on the attributes such as whether the avatar is interacting with a nearby object, whether the original pose can be accommodated, and also the functional aspect of the space, such as whether it is a dining space or a study space. This was done by first collecting user preferences of the above-mentioned attributes and quantifying these with a set of features. A neural network was then trained on these features to predict the most similar position between the environments. However, the problem with only finding equivalent positions between the environments is that these positions are not continuous from a topological perspective. Hence, there is no correspondence of continuous paths between the remote and local environments, which is a problem for naturalistic locomotion. In order to solve the continuity problem, motion retargeting using a mesh has been proposed. A mesh is associated with an object in one environment and is deformed to fit a similar but different shaped object in another environment. The mesh is used to track the motion around the object from one environment and then redirect this motion to the other object. Many different mesh deformation and parameterization techniques can be used. The deformation procedure usually involves deforming the mesh in such a way as to minimize the energy associated with the mesh, subject to new positional constraints. Mesh deformation has been achieved using several techniques including Dirichlet energy, As-rigid-as possible (ARAP) energy, and various variations of it. However, the mesh deformation techniques mentioned have been demonstrated only for motion redirection on small-scale objects. They cannot be directly applied to room scale environments due to high computational cost.

Factors of naturalistic human locomotion. Human locomotion is the result of complex cyclic movements and coordination of different skeletal-muscle groups. It is constrained by kinematic limits as well as balance and stability constraints. Kinematic motion constraints arise because human movement is constrained at the anatomical level by the limit on joint rotations and accelerations, which limit the locomotion trajectory that a human can take. Stability and balance constraints arise due to the dynamics of body posture to prevent falling. As a result of these constraints the maximum speed a human can walk is limited. It is dependent on many factors such as age, body type, physical health, and the like. An analysis of the maximum locomotion speed across age groups is shown in R. W. Bohannon, "Comfortable and maximum walking speed of adults aged 20-79 years: reference values and determinants," *Age Ageing*, vol. 26, no. 1, pp. 15-19 (1997). There have been several physics-based methods created to model naturalistic walking. Realistic walking paths were modelled in C. Wienrich et al., "Social Presence and Cooperation in Large-Scale Multi-User Virtual Reality—The Relevance of Social Interdependence for Location-Based Environments," 25*th IEEE Conf. Virtual Real.* 3*D User Interfaces, VR* 2018-*Proc*., pp. 207-214 (2018) and gait has been modelled in C. Yam et al., "Gait recognition by walking and running: a model-based approach," (2002). The kinematic evaluation of the walking trajectories has also been conducted in VR environments. Realistic walk paths have also been generated using probability-based modelling from a database consisting of walk samples. Kinematic and dynamic walking constraints have been modelled specifically for avatar locomotion in the velocity domain. However, in literature, these locomotion constraints have not been combined with a room scale locomotion redirection framework for avatars in remote/local AR scenarios.

Accordingly, the present disclosure provides a system and method to apply mesh deformation to room scale environments that is computationally inexpensive. As discussed below, the method can integrate naturalistic locomotion constraints together with the mesh deformation to obtain a locomotion path for the avatar to follow.

Figure 2:
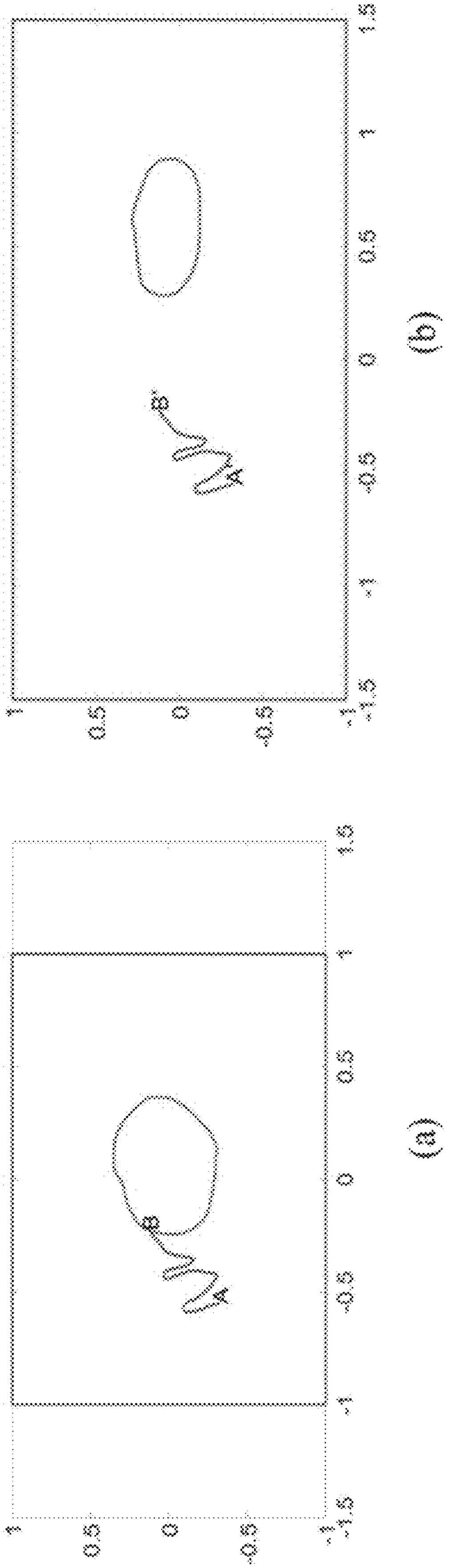
FIG. 2 illustrates an incorrect locomotion path A'B' in the avatar's environment (b) when the user's locomotion path AB (a) is directly mapped from their environment. The blue boundary represents the room exterior and the green boundary represents the furniture on which virtual objects are placed. Note the difference in spatial dimensions between the environments.

The problem of generating naturalistic locomotion can be divided into two components: 1) generating the equivalent reference path between the user's and the avatar's environment; and 2) using a trajectory planning framework to follow the equivalent reference path, while not violating naturalistic constraints of walking. A room environment R can be considered to consist of a rectangular shaped external boundary E as shown in blue in FIG. 2, flat surface objects $\{I_1, I_2 \ldots I_n\}$ shown in green in FIG. 2, and walkable spaces W in the interior. When a user walks, their path can be tracked as a set of Cartesian position coordinates (x, y, z) as shown by the path AB in FIG. 2 (at a). These coordinates can be obtained from the HMD the user wears. However, the user's locomotion path cannot be directly mapped from their environment to that of the avatar's, primarily due to the different spatial configuration between the environments. This is shown in FIG. 2, when the user's path AB in their environment $R_1$ is directly mapped as the avatar's path A'B' in its environment $R_2$. Thus, for the avatar to reach the same corresponding location as the user in their environment, the path AB in environment $R_1$ has to be modified according to the constraints of environment $R_2$. Thus, the problem becomes one of finding a mapping function between the room environments 1 and 2 $f_R: R_1 \rightarrow R_2$ for all possible paths. This will include finding the corresponding equivalent maps for the walkable surfaces $f_w: W_1 \rightarrow W_2$, exterior room boundaries $f_E: E_1 \rightarrow E_2$, and for each furniture object between the environments $f_I: \{I1_1, I1_2, \ldots I1_n\} \rightarrow \{I2_1, I2_2, \ldots I2_n\}$. It is assumed that there exists a continuous bijective map for $f_E$. This assumption simplifies the mapping and is a reasonable assumption to make because interior and exterior boundaries in both rooms although not exactly the same, will likely be of topologically similar shape. Once this equivalence between the two environments is obtained, a reference path for the avatar can be obtained for any path the user takes in their environment. The generated path is used as a reference by the trajectory planning framework described below, that makes the avatar follow it and also modifies the avatar's speed profile such that the kinematic and naturalistic constraints of human locomotion are not violated while following the path.

Method for Generating Equivalent Paths

The components that are involved in generating an equivalent path are discussed below. This process includes first generating a spatial mesh to track the user's path, then generating the boundaries for the interior furniture objects and finding the correspondence between these objects between the user's and avatar's environment, and finally deforming the mesh associated with the user's environment to the spatial configuration of the avatar's environment to generate the equivalent path.

Figure 3:
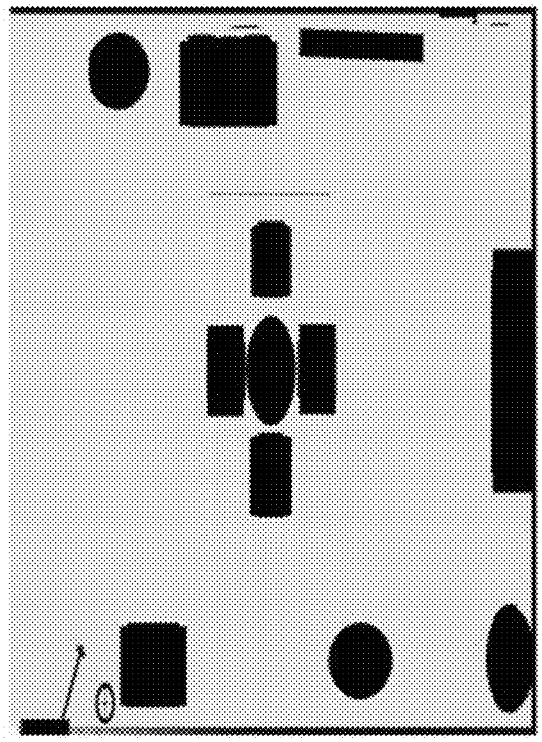
FIG. 3 illustrates a sample virtual scene (a) used for classifying objects as walkable, shown in white and non-walkable, shown in black. (b) shows the projection of scene (a) onto a 2D plane to obtain interior furniture object boundaries.
Figure 3:
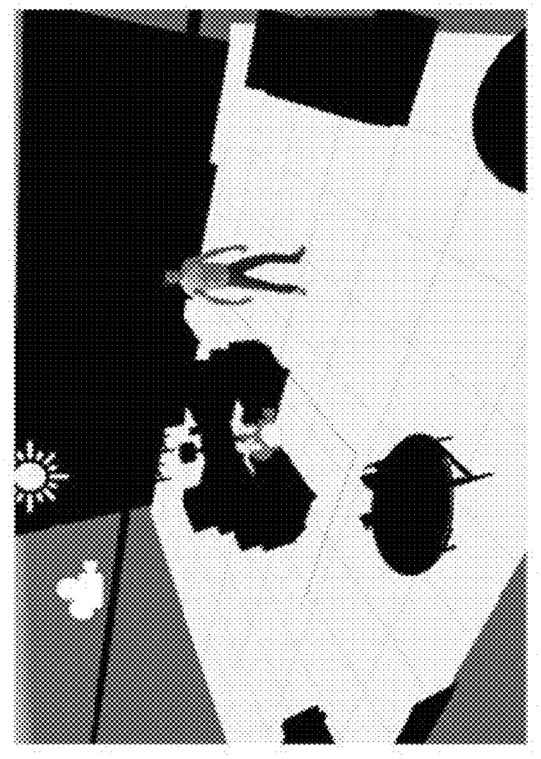
Figure 4:
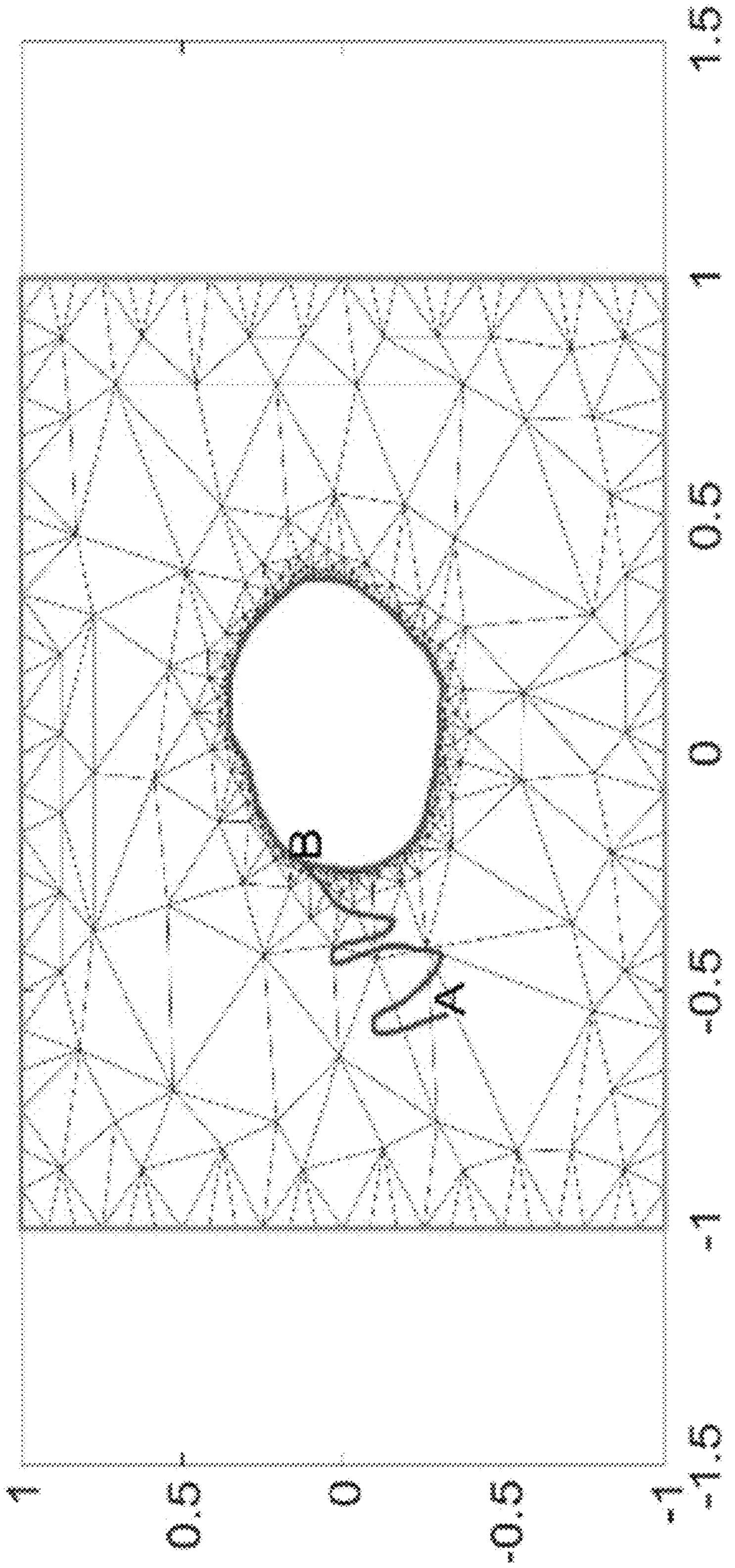
FIG. 4 illustrates a 2D spatial mesh generated for a room environment. The blue boundary represents the room exterior, the green boundary represents the irregular shaped furniture and the red path AB represent the user's locomotion path.

Using a spatial mesh to track locomotion. The concept of a mesh to track the locomotion of the user in their environment was used. The idea is advantageous because a mesh associated with the user's environment can be deformed to fit the avatar's environment. This deformation allows one to obtain the equivalent path between the environments, described below. As mentioned above, three-dimensional (3D) meshes have been used for redirecting motions in localized spaces around small objects. However, using a 3D tetrahedral mesh for room size environment is computationally costly. For redirecting a user's action in 3D for room size environments a piecewise approach is used, where the locomotion from a 2D perspective is considered. 2D locomotion can be combined with the positional redirection to achieve an overall 3D redirection between the user's and avatar's environment, making it computationally feasible in real time. In order to generate a 2D spatial mesh of the room, the boundaries of the interior furniture objects and the room need to be obtained. The furniture object boundaries are obtained by first mapping a room environment using an AR HMD to obtain a 3D mesh of the room. The components of the mesh can be classified as walkable and non-walkable. An example of such a classification is shown in FIG. 3. Once the mesh components in the environment are classified as non-walkable, their boundaries can be obtained on the 2D plane using an orthographic projection of the 3D vertices onto a 2D plane as shown in FIG. 3 (at b). From this projection, the mesh vertex boundary points for the interior furniture objects are obtained. Since rooms are rectangular in shape, for obtaining the room exterior boundary vertices, an equidistant spacing of points can be used as the vertex positions for each side of the rectangle, and the vertex positions can just be transferred to the corresponding side in the avatar's room environment, scaled according to its dimensions. If room exterior boundaries are irregular, then exterior correspondence between the environments has to be obtained similar to obtaining interior correspondence between environment objects as described below. The entire method of obtaining the interior and exterior boundary vertices can be parallelized and be performed in real time using shader codes in Unity. Once these boundary mesh vertices are obtained, the mesh for a particular room can be generated. There are many different triangulation techniques that can be used to generate the mesh, the only requirement being that the generated mesh should be a Delaunay mesh. Delaunay meshes do not contain highly acute angled triangles and can be smoothly deformed. An example of a generated mesh for a user's environment is shown in FIG. 4 where the room exterior boundary is shown in blue, the flat surface objects in green, and the user's path is shown in red as AB. The user's path is recorded using barycentric coordinates, i.e., each point in the path is recorded relatively with respect to the three vertex positions of the triangle that the particular point is present in. Using barycentric coordinates allows this path to be remapped once the deformed mesh has been generated according to the avatar's environment.

Figure 5:
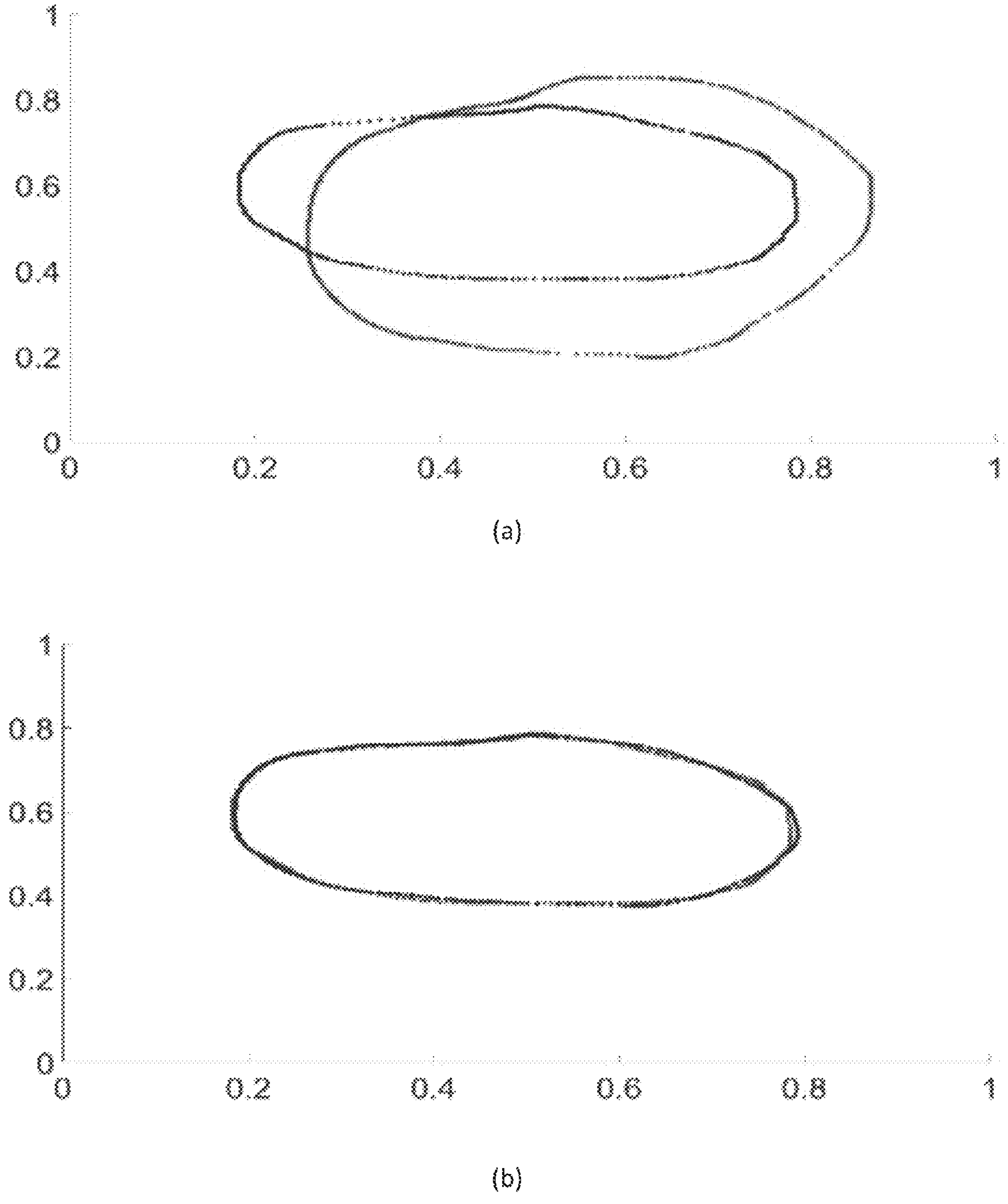
FIG. 5 illustrates obtaining the correspondence between different shaped interior object boundaries. (a) Corresponding interior object boundaries of the user's (red—$I1_1$) and their avatar's environment (blue—$I2_1$) shown on the normalized 2D plane. (b) The fitting of the user's interior object boundaries to that of the avatar's using non-rigid transformation technique. For each point on the avatar's object boundary (blue—$I1_1$) there is a corresponding point of the user's object boundary after applying the transformation (red—$I1'_1$).

Finding the correspondence between different interior furniture object boundaries. Once the boundaries of the interior furniture objects for both the user's and the avatar's environment are obtained, the correspondence for each of these objects is needed, i.e., to obtain the mapping $f_I$: $\{I1_1, I1_2, \ldots I1_n\} \rightarrow \{I2_1, I2_2, \ldots I2_n\}$. This is necessary because the spatial mesh in the user's environment is attached to the vertices of the furniture object boundary and in order to determine the extent of deformation of the mesh, the corresponding vertices to the furniture object in the avatar's environment needs to be known. For obtaining the interior object correspondence, the non-rigid Iterative Closest Point (ICP) algorithm is used, which has been shown to perform well for obtaining the correspondence between dissimilar shaped 3D objects. Different types of non-rigid transformation algorithms exist and can be used according to the user's specific requirements. The non-rigid ICP algorithm takes the boundary vertices of the user's and avatar's environment interior furniture objects $I1_1$ and $I2_1$ as input and non-rigidly deforms $I1_1$ to create $I1'_1$, such that it fits the shape of $I2_1$. $I2_1$ is then replaced with $I1'_1$ to get the furniture object coordinates in the avatar's environment that the user's environment mesh must deform into. An example of using the non-rigid ICP algorithm to fit $I1_1$ to $I2_1$'s shape is shown in FIGS. 3-5.

Finding correspondence for walkable surfaces between environments. The user's room environment has a spatial mesh $W_1$ associated with its walkable space. The approach to finding the correspondence between the walkable spaces of the user's and avatar's environment is to generate a new mesh $W_2$ that has the same connectivity as that of $W_1$ by deforming $W_1$ such that the boundaries of it coincide with the avatar's interior object and room boundaries of $\{I2_1, I2_2, \ldots I2_n\}$ and $E_2$. Once $W_2$ has been generated, then the correspondence between $W_1$ and $W_2$ are obtainable, i.e., the i-th vertex of $W_1$ is mapped to the i-th vertex of $W_2$. The mapping function $y=f_W(x)$ for any $x \in W_1$ can be defined as follows:

$$y = \sum_{i=1}^{3} b_i(x) v_{id(x,i)} \quad \text{(eq. 1)}$$

where $b_i(x)$ is the i-th barycentric coordinate of $x \in W_1$ in the associated triangle of which the vertices are identified by id(x, i). $v \in R_2$ denotes the position of the corresponding vertex in $W_2$. In other words, this means that $x \in W_1$ is mapped to $y \in W_2$ using the same barycentric coordinates, but with the vertices of the triangle of the transformed mesh in which x is present. In order to obtain the transformed vertex positions of $W_2$, the deformation that minimizes the Dirichlet energy associated with the user's room's mesh subject to the boundary conditions of the avatar's room, i.e., $\{I2_1, I2_2, \ldots I2_n\}$ and $E_2$ is used.

Figure 6:
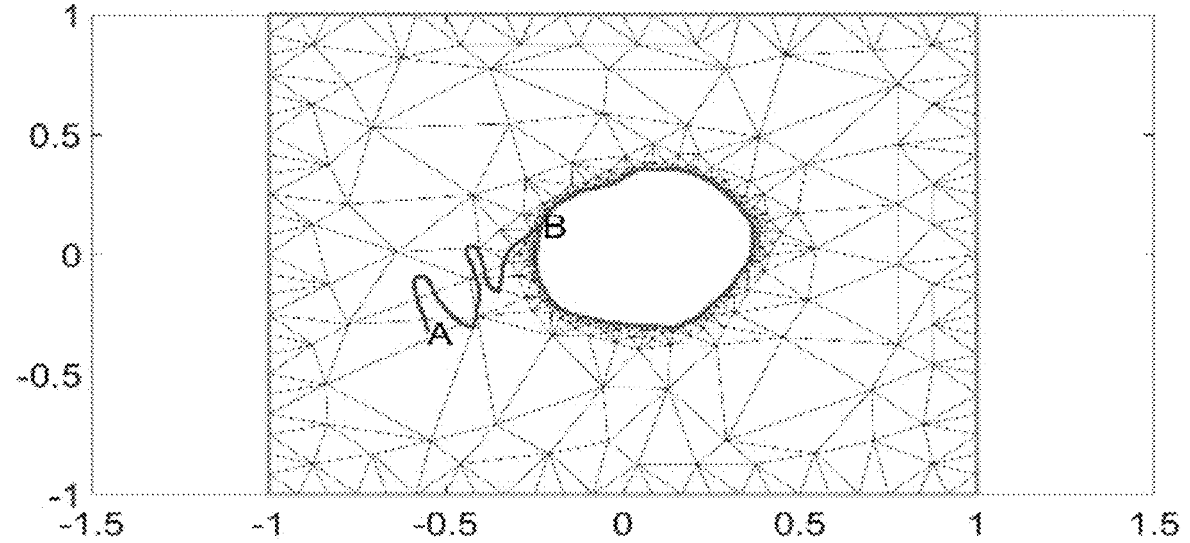
FIG. 6 shows the mapping of a user's walking path from their environment (a) to their avatar's environment using mesh deformation (b). The deformation that minimizes the Dirichlet energy associated with the user's room's mesh subject to the boundary conditions of the avatar's room was used.
Figure 6:
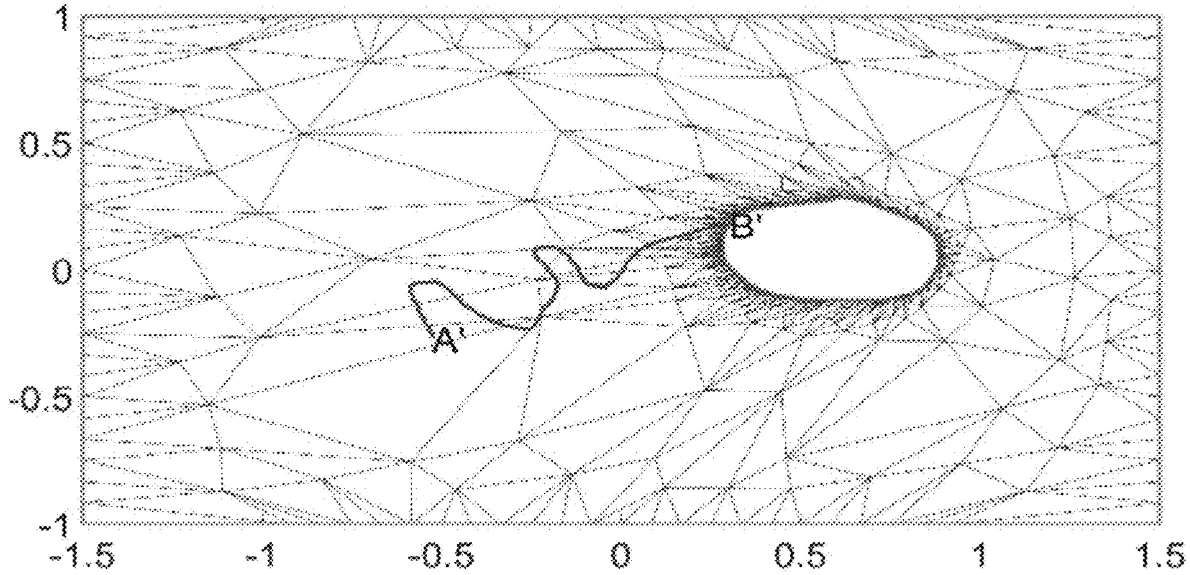

The Dirichlet energy is used to measure the magnitude of the distortion associated with a mesh and the goal is to minimize this energy. A solution that minimizes the Dirichlet energy can be understood physically as a solution of a static spring system, in which the distortion of each element tends to spread out evenly overall, without concentrating on a particular local area. Therefore, the solution achieves smooth deformation and hence a smooth equivalent path. An example of mesh deformation using the above procedure is shown in FIG. 6.

Describing Walking Constraints

Figure 7:
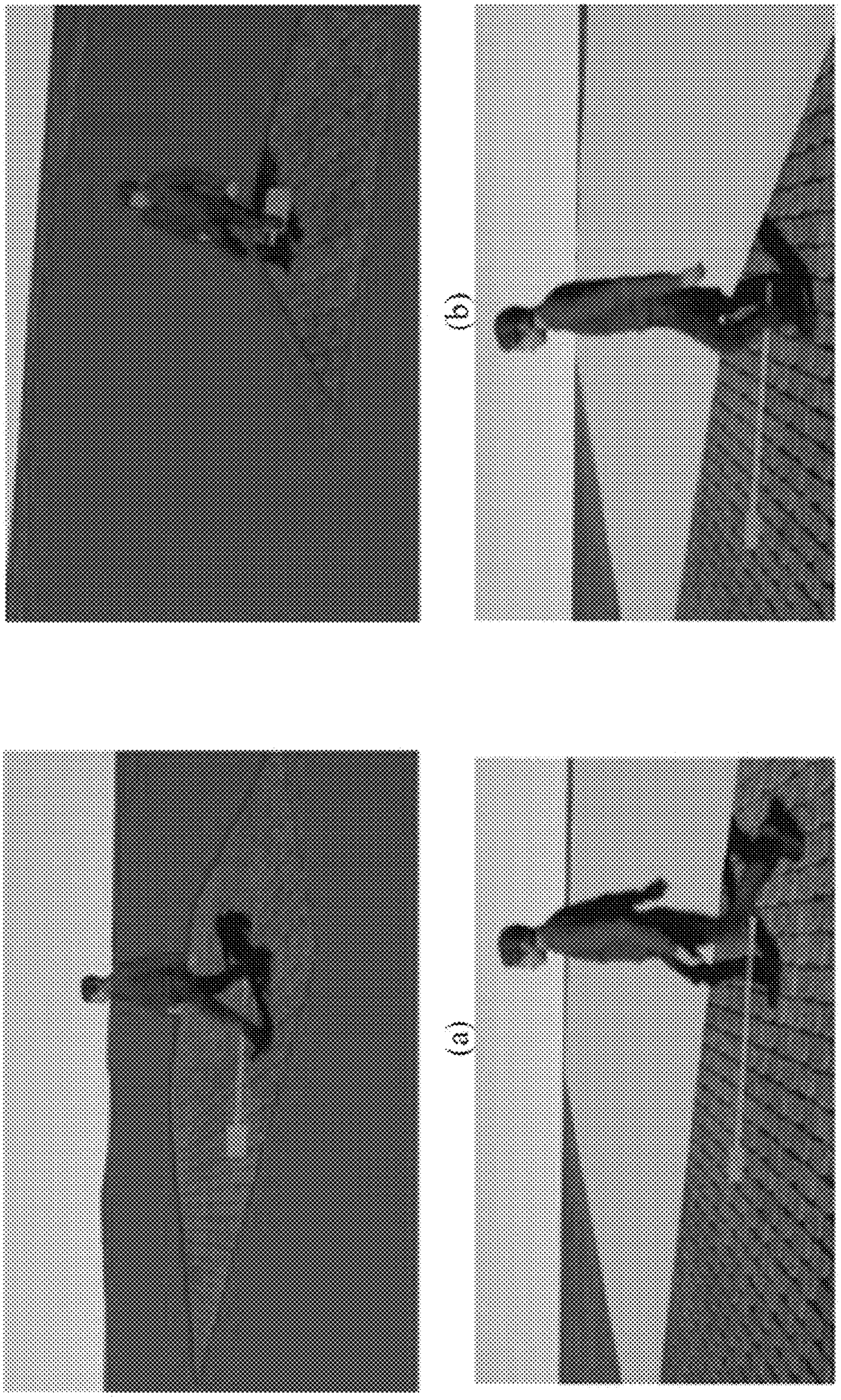
FIG. 7 shows kinematic constraints (a and b) and dynamic stability balance constraints (c and d). An example of an acceptable velocity vector is shown in green. Any vector starting from the human's position and intersecting either the blue or yellow planes are not acceptable solutions. The asymmetry of acceptable velocities during forward gait (a) and turning (b) is shown for kinematic constraints. Similarly, the change of the half-plane constraint for the mid-gait (c) and initiation cycle (d) is shown for the balance constraint.

Once the equivalent path is generated, the path however, may not be directly followed by the avatar. This is because the length of the path may vary based on the deformation causing the avatar to violate naturalistic speed and walking constraints in certain segments of the path. For example, due to the change in path length, the avatar's step length may be greater than the maximum gait distance possible for a human. It is important for the avatar to not violate these constraints, as it will make the avatar's locomotion look unnatural, which will reduce the naturalism of the interaction. As described above, there are variety of ways to describe walking constraints. The method used herein is described by Narang et al. since the constraints here are described in the velocity domain. Walking constraints can be broadly divided into kinematic motion constraints and stability and balance constraints. Kinematic motion constraints arise because human movement is constrained at the anatomical level by the limit on joint rotations and accelerations, which limit the locomotion trajectory that a human can take. Stability and balance constraints describe the dynamics of body posture to prevent falling. When stationary, the body's center of gravity (COG) needs to be inside the "base of support", i.e., the area defined by the ground contact points of the human. However, the walking motion requires moving the COG outside the base of support and yet preventing the body from falling, a condition described as 'dynamic stability'. During gait initiation, one voluntarily initiates a forward fall to accelerate the COG ahead of the base of support. It is imperative that the swing foot is placed such that the COG returns to within the base of support, and thus prevents the fall. Both constraints can be formulated as half-plane constraints in terms of the acceptable set of velocities. These acceptable set of velocities are calculated for every gait cycle and the method to calculate them is shown in. FIG. 7 depicts examples of both the kinematic and dynamic half plane constraints. The final acceptable set of velocities is the intersection of the acceptable velocities for the kinematic and balance constraints.

Planning the Trajectory of the Avatar

The trajectory planning method is used to modulate the velocity profile of the avatar in such a way that it is spatially and temporally synchronized with the user's motion in its environment. For simplicity, the user and the avatar are treated as a point object. There are mainly two types of trajectory planning approaches: point-to-point approach, in which only the subsequent position of the path is known and the velocity profile is planned accordingly, and many-point approach where the full path is known beforehand with the intermediate points sampled from this path to plan the trajectory. For the remote/local AR scenario, since mapping the avatar motion in relation to the user in real time is desirable, the point-to-point approach is used. The components of this approach are explained below:

Modelling the trajectory using cubic polynomial. The main goal of the trajectory planning method is to obtain a position, velocity and acceleration profile for the avatar. We model the position of the avatar using a cubic polynomial as this will give us a linear acceleration with a parabolic velocity profile, that is desirable due to the gradual change in velocity. The position of the avatar x(t) can be written as:

$$x(t) = a_3t^3 + a_2t^2 + a_1t + a_0 \quad \text{(eq. 2)}$$

resulting into a parabolic velocity profile v(t)

$$v(t) = 3a_3t^2 + 2a_2t + a_1 \quad \text{(eq. 3)}$$

and a linear acceleration profile a(t)

$$a(t) = 6a_3t + 2a_2 \quad \text{(eq. 4)}$$

Since there are four coefficients, four constraints can be imposed. This includes the initial and final avatar positions $x_i$ and $x_f$, and the initial and final avatar velocities $v_i$ and $v_f$. The instantaneous velocity of the user can be obtained from the AR-HMD by linearly interpolating the subsequent positions coordinates that the HMD records. The method to obtain $v_f$ for the avatar is shown below. The time taken between the two points of the trajectory $t_f$ should be the same for the user and the avatar. The system of equations to obtain the coefficient values is shown below:

$$a_0 = x_i \quad \text{(eq. 5)}$$

$$a_1 = v_i \quad \text{(eq. 6)}$$

$$a_3t_f^3 + a_2t_f^2 + a_1t_f + a_0 = x_f \quad \text{(eq. 7)}$$

$$3a_3t_f^2 + 2a_2t_f + a_1 = v_f \quad \text{(eq. 8)}$$

Figure 8:
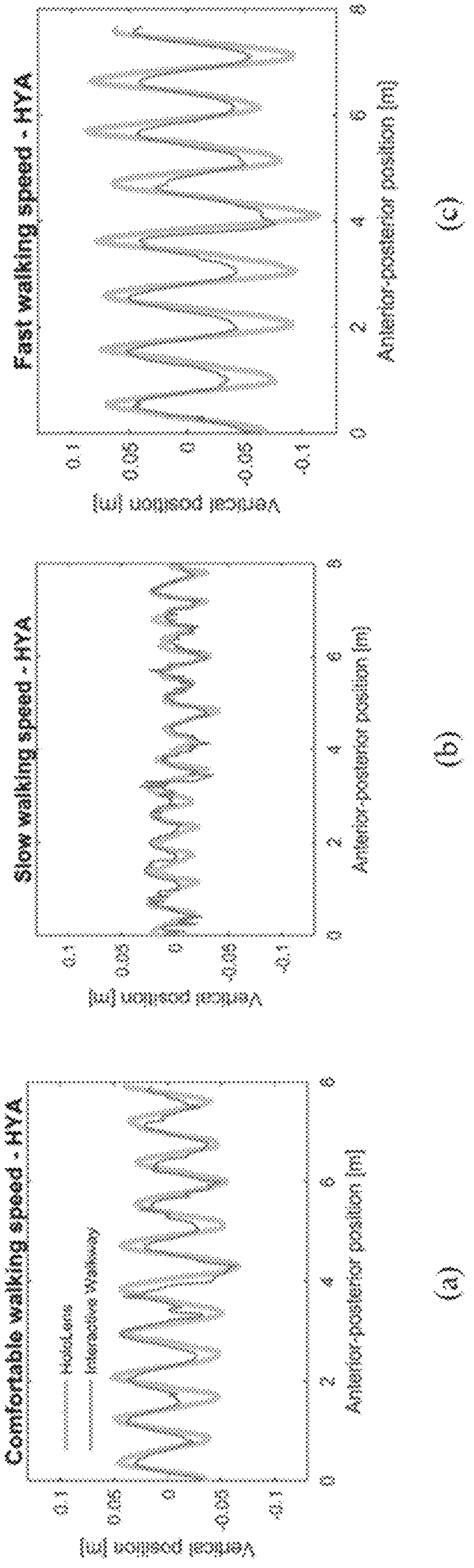
FIG. 8 shows the variation in positional values of an AR-HMD when walking is performed by healthy young individuals (HYA) for (a) comfortable walking speed, (b) slow walking speed and (c) fast walking speed.

Deciding the point-to-point motion interval. For a point-to-point approach, one needs to decide how to sample the next position, i.e., $x_f$ for the avatar to move from its current position $x_i$. Theoretically, every 2D position from the user's environment can be mapped to the avatar's environment and the avatar motion can be interpolated from these points. However, this is not very useful, especially when considering imposing naturalistic locomotion constraints. Hence, the sampling interval was selected as the user's gait. This can be obtained from the user's AR-HMD using filtering techniques and shown in FIG. 8 for various walking speeds. The advantage of using the gait cycle as the sampling interval is that it is easier to apply the balance constraint of locomotion, which is defined for every gait cycle.

Figure 9:
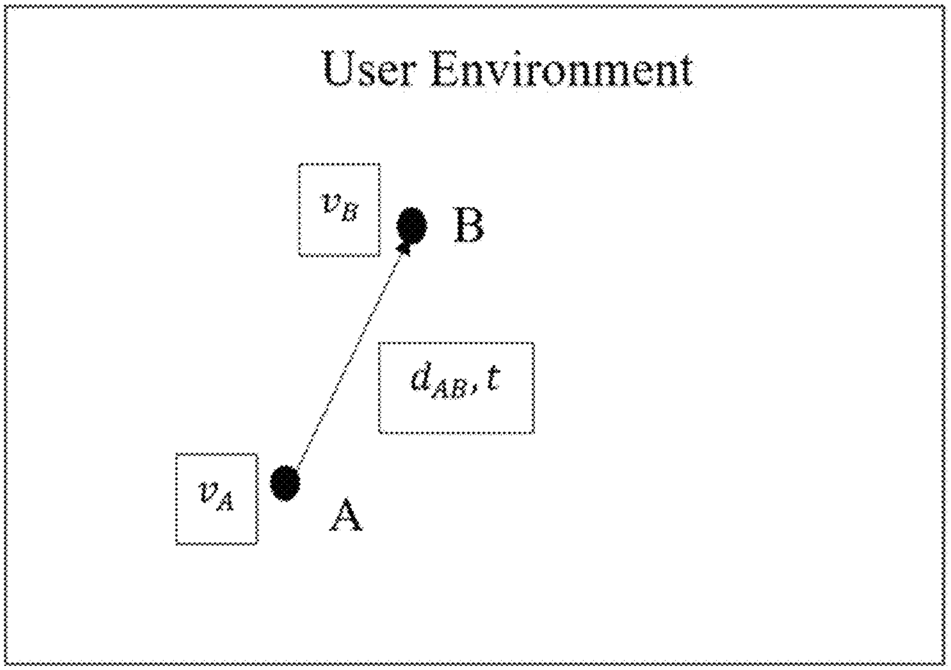
FIG. 9 illustrates the setup that occurs during trajectory planning in a remote/local AR scenario. (a) The user motion in their environment. The time t it takes the user to locomote between A and B is used in determining the avatar's final velocity at B' in its environment. (b) The equivalent position the avatar has to locomote to B' if not constrained by naturalistic walking and B" if constrained by naturalistic walking. Vmax is the maximum allowed velocity within naturalistic walking constraint.
Figure 9:
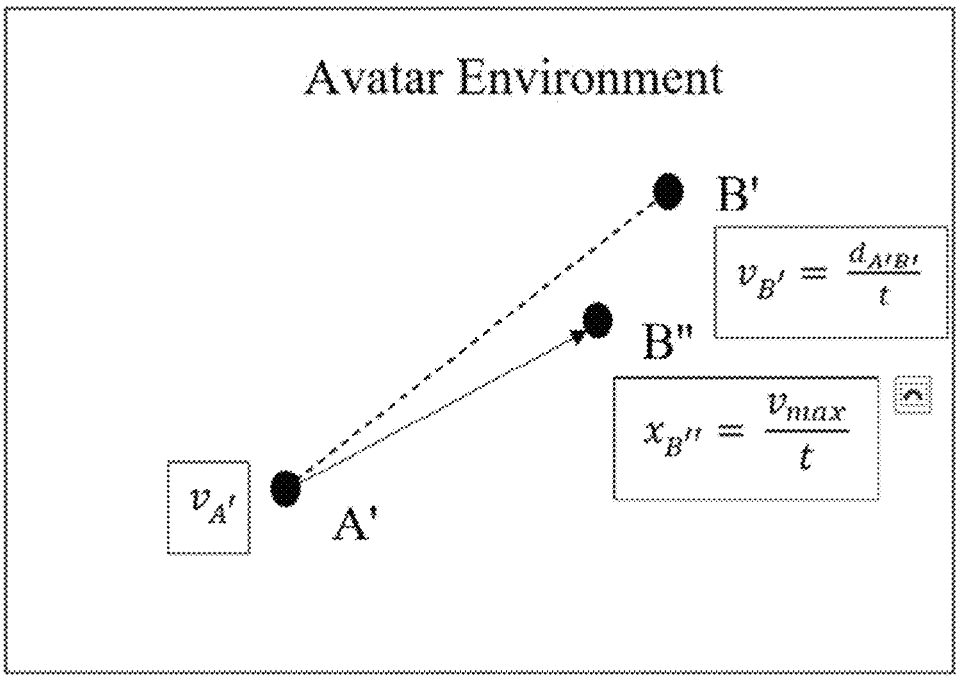

Trajectory framework. As mentioned above, in order to solve the system of equations for linear acceleration trajectory, one needs to know the initial and final positions $x_i$ and $x_f$, and the initial and final avatar velocities $v_i$ and $v_f$. The setup is described as shown in FIG. 9 where FIG. 9 (at a) describes the user's environment and FIG. 9 (at b) describes the avatar's environment. When the user walks from point A to B, i.e., one gait cycle, the equivalent position of the B, i.e., B' is obtained from the deformed mesh. The time t it takes the user to move from point A to B is known. In order to generate a motion profile, the velocity at B' needs to be determined. There are two cases to consider when determining the velocity at B': 1) when B' can be reached without violating naturalistic walking constraints 2) when B' cannot be reached without violating naturalistic walking constraints.

Case 1: when equivalent avatar position can be reached without violating walking constraint In this case the velocity at B' is determined by:

$$v_{B'} = \frac{D_{A'B'}}{t} \quad \text{(eq. 9)}$$

where $d_{A'B'}$ is the distance between the equivalent points A' and B' and t is the time taken for the user to move from A to B in their environment.

Case 2: when equivalent avatar position cannot be reached without violating walking constraint In this case, the equivalent point B' cannot be reached without violating naturalistic constraints. Hence a new equivalent position B" needs to be obtained. The position of B" is obtained by:

$$x_{B''} = \frac{v_{max}}{t} \quad \text{(eq. 10)}$$

where $v_{max}$ is the maximum allowable velocity with the kinematic and balance constraints applied. It is to be noted that the vector $v_{max}$ is pointed in the direction that minimalizes the distance between the points B' and B".

Once the final velocity $v_f$ is obtained, the motion profile of the avatar can be generated, and the above-mentioned process is repeated again for the next gait cycle. The avatar gait cycle is adjusted according to the speed using a walking motion synthesis generator.

Redirection of Locomotion Paths for Obstacle Avoidance in Remote Augmented/Mixed Reality

Introduction

Figure 10:
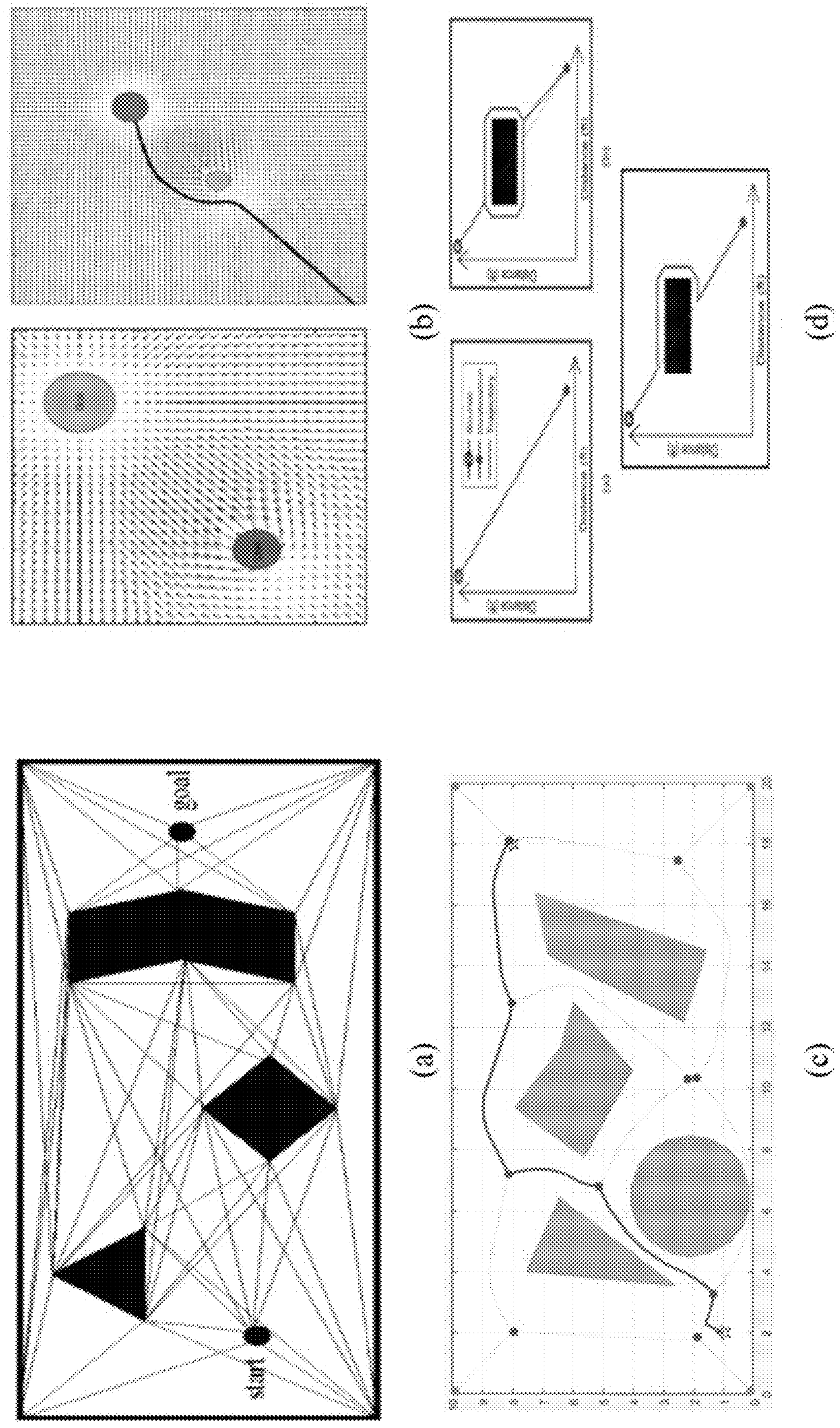
FIG. 10 illustrates global path planning obstacle avoidance techniques: (a) using visibility graphs; (b) using potential fields; (c) using Voronoi paths. Local path planning obstacle avoidance using (d) Bug algorithms.

Obstacle avoidance has been a well-studied field in robotics. The question of obstacle avoidance appears during the path planning problem, i.e., how to locomote from a start position to a goal position in a particular environment while avoiding obstacles. Generally, path planning approaches can be broadly classified into two types, i.e., global and local path planning. In global path planning, the robot has complete prior knowledge of its environment. This includes the information of the obstacles, its size, shape, orientation, as well as the start and end goal locations. In local path planning, on the other hand, the robot has little or no prior information about the environment. Thus, updates need to be made as it encounters the obstacles and explores its environment. Global obstacle avoidance methods include methods such as visibility graphs, Voronoi paths, and obstacle avoidance using potential fields as shown in FIG. 10. In the visibility graph method, the obstacle boundary consists of vertices which can be treated as nodes of a graph. These nodes are connected to adjacent obstacle nodes and these connections can be considered as the edges of the graph. The obstacle free path will lie along these edges. However, visibility graphs work only when the obstacles are regular polygon shaped. For the Voronoi approach, each obstacle is considered as a Voronoi cell, which includes all points of the plane closer to that obstacle than to any other obstacle. The goal is to find a set of points that are furthest from every other cell. This guarantees the safest path for the robot since the path will be located at a maximum available distance from all of the nearby obstacles. Obstacle avoidance using potential fields involves treating the robot as a particle that is under the influence of an artificial potential field and represented as a point in the robot's configuration space. The goal is to navigate the robot towards attractive fields such as goal targets and away from repulsive fields, i.e., obstacles within its operating environment. All of the above-mentioned global methods avoid obstacles and try to move away as far as possible from them. Although this is the safest path to avoid collision, it may not be ideal from a remote/local AR scenario since this would increase the distance the avatar moves from the reference equivalent path. Local path planning methods, on the other hand, are used when the information about the environment is uncertain. They can be classified into classical and heuristic approaches. Classical approaches involve the Bug algorithms, which have iterations, Bug 1 and 2 approaches as shown in FIG. 10 (at d) and vector field histogram methods. Heuristic approaches involve obstacle avoidance techniques that have a learning component and include techniques that use neural networks, fuzzy logic, and genetic algorithms. Although, local methods tend to follow the obstacle boundaries closely, if the obstacles are highly irregular, it increases the distance the robot has to travel, and the path followed is not smooth, which is uncharacteristic of human locomotion.

In MR, most obstacle avoidance techniques have been borrowed from robotics and modified according to the specific MR applications. One such application has been during redirected walking (RDW). RDW helps users explore a larger virtual environment within a smaller physical space. For obstacle avoidance in RDW, techniques such as visibility graphs, simultaneous localization and mapping (SLAM), and artificial potential functions have been used. RDW techniques for dealing with irregularly shaped environments and dynamic obstacles have also been developed. This is done by proportionally adjusting the RDW rotational gain, so that users react accordingly and avoid the obstacle. For avoiding other users in the environment, relative velocities with each other are calculated and used as a metric to form a safety buffer around each user to avoid collision. These techniques have been used to make RDW possible in shared spaces with multiple users. There have also been MR applications that rely on the user's volition to avoid obstacles. Such applications achieve obstacle avoidance by providing cues to the user in advance of an approaching obstacle. This includes dynamic modification of the field of view (FOV) of a HMD to alert user of obstacles in VR and a floor projected guidance of an obstacle free path in AR. There have also been methods used to identify obstacles in the real environment and project these as natural obstacles in the virtual scene. These methods include displaying real world obstacle outlines in the virtual environment of the user and also disguising the obstacles in the real world as obstacles in the virtual world. Haptic visual feedback has also been used to avoid surface obstacles during walking. The haptic vibratory feedback is given to the user's feet through a specially modified shoe. Machine learning techniques for obstacle avoidance have also been explored. Applications include using mobile AR to alert pedestrian of obstacles and generating VR scenes with congruent walkable paths and obstacles with the physical environment.

Generating the Path Around the Obstacle

Figure 11:
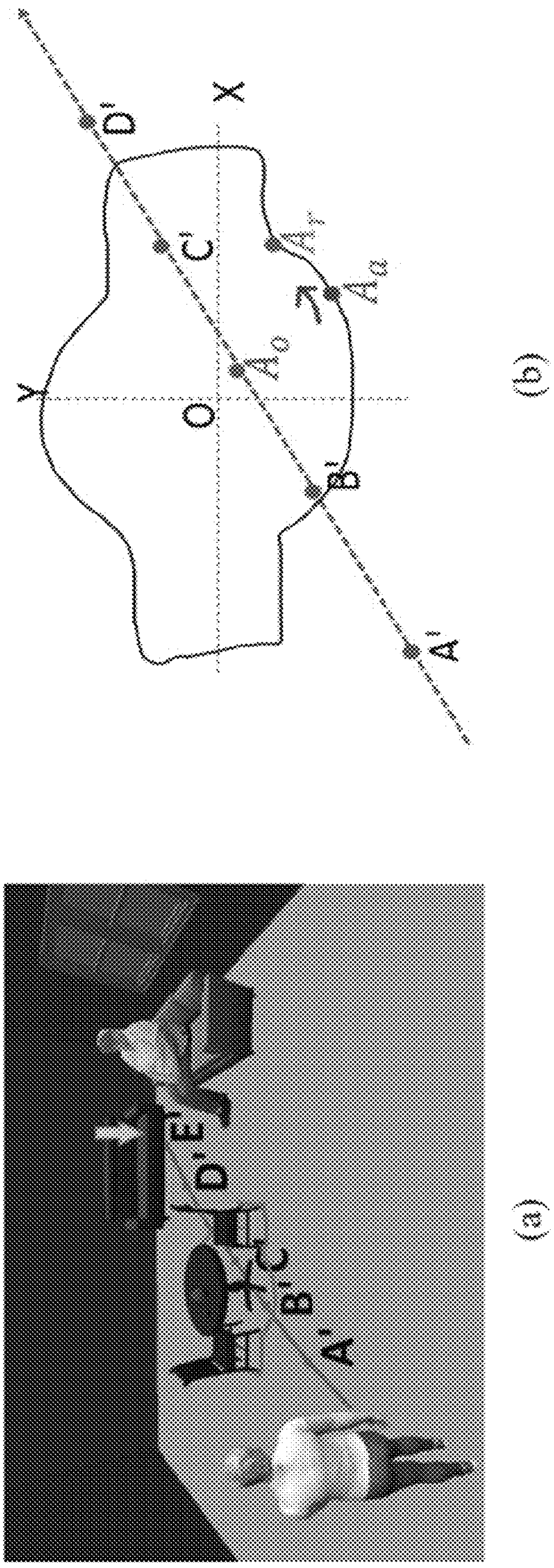
FIG. 11 illustrates a sample setup of a remote/local AR locomotion scenario with an obstacle. (a) The equivalent path A'B'C'D'E' obtained from the user's locomotion in their environment that passes through the obstacle. The obstacle is represented by its 2D boundary shown in purple. (b) The setup of (a) shown on an XY plane.

The setup of a remote/local AR locomotion scenario is shown in FIG. 11. Obstacles in the environment can be represented by their 2D object boundaries as shown for the dining chair in FIG. 11 (at a). The method to obtain 2D object boundaries of obstacles as mesh vertices is described above. A'B'C'D'E' represents the equivalent path for the avatar to follow, without consideration of the obstacle. This path is referred to as $E_Q$. $E_Q$ is obtained based on the user's path in their room. The method to generate this path is described above. The 2D view of the room in FIG. 11 (at a) is shown on a XY plane in FIG. 11 (at b). $A_o$ represents the avatar's original reference position on the equivalent path, i.e., $A_o$ moves along the equivalent path A'B'C'D'E' as the user moves along the path ABCDE in their room (FIG. 1 (at a)). However, as mentioned previously, the avatar cannot directly follow $A_o$ since it will pass through the obstacle causing an unnaturalistic interaction. Thus, $A_o$ needs to be mapped onto the obstacle boundary for the avatar to follow. This mapping of $A_o$ to the obstacle boundary is shown by $A_r$, known as the avatar's boundary reference position, represented by a green dot in FIG. 11 (at b). This mapping is referred to as $f_{OR}$: $A_o \rightarrow A_r$. Since the avatar has to follow naturalistic walking constraints it has a maximum speed limit on its locomotion. Its path has to be continuous as well. Hence its actual position on the boundary, represented by $A_a$ and shown using a purple dot in FIG. 11 (at b), will lag $A_r$ in many cases. When mapping the avatar's path around the obstacle, a few aspects need to be considered. First, since obstacles can be of any shape and can occur in any configuration one should be able to map the avatar's path around any irregular-shaped obstacle. Second, due to irregularly-shaped obstacles, directly following its boundary can lead to the avatar unnecessarily locomoting longer distances and more importantly, is not characteristic of how humans avoid obstacles. Research has shown that during locomotion, humans do not suddenly change directions, nor do they avoid obstacles by following along the borders of obstacles. They have a minimum turning radius during walking due to their inertia and seek to conserve energy. Thus, such constraints cause humans to turn in smooth paths and avoid abrupt changes in direction. Hence, in order to preserve naturalistic locomotion, the mapped path around the obstacle should be as smooth as possible, even for highly irregular obstacles. Third, obstacles avoidance is rarely conducted in isolation and generally occurs in tandem with path planning. Thus, the avatar will need to avoid an obstacle while following a path. In this case, in FIG. 11, the path is the equivalent path $E_Q$, which will pass through the obstacles if not adapted to avoid obstacles. The mapping $f_{OR}$: $A_o \rightarrow A_r$, is obtained based on the avatar's position from the interior to the exterior boundary of the obstacle. The mapping from the interior to the exterior $f_{OR}$: $A_o \rightarrow A_r$ should be in such a way so to minimize the lag between $A_o$ and $A_a$ when $A_o$ exits the boundary curve enclosing the obstacle.

Figure 12:
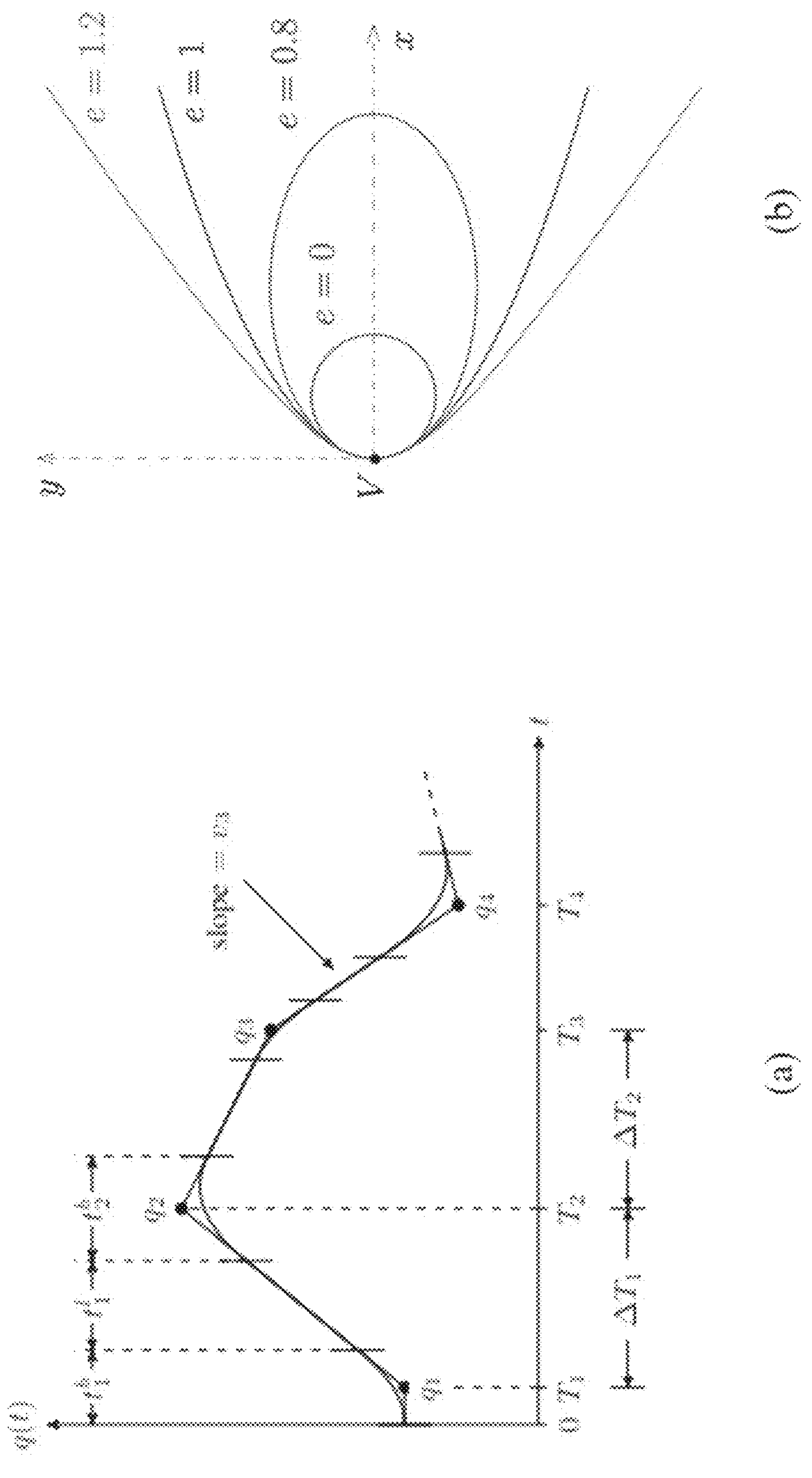
FIG. 12 illustrates (a) Smoothing of a 1D irregular path using parabolic blends used for robotics application. (b) Conversion between parabola, circle and ellipse by varying the eccentricities.
Figure 13:
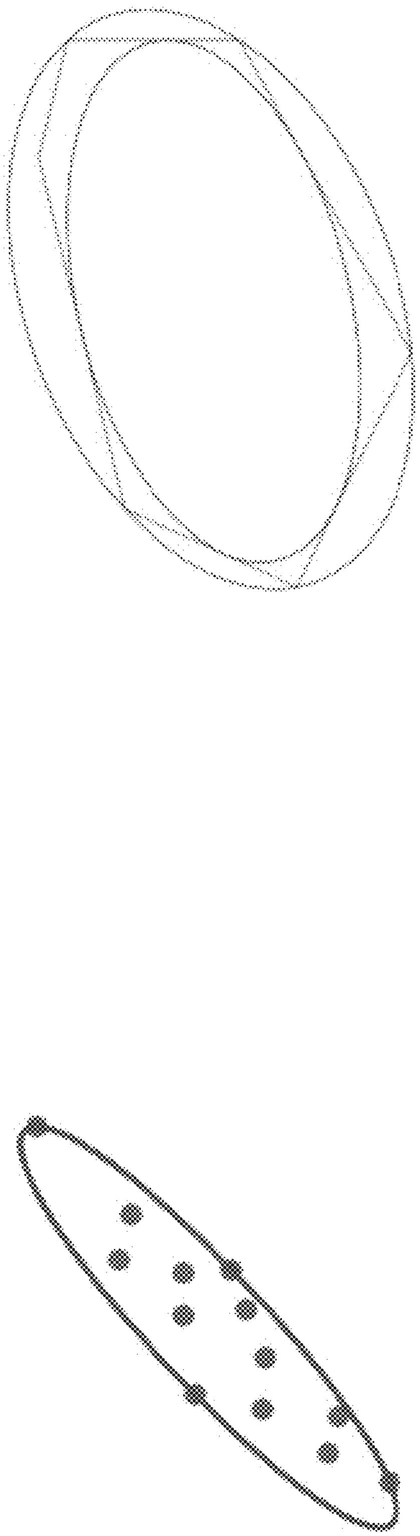
FIG. 13 shows the use of ellipses to enclose obstacles. (a) An ellipse known as the John-Lowner ellipse is the minimum area ellipse can be used to enclose any set of vertices. (b) Example of the inner and outer John-Lowner ellipse for a polygon obstacle.

Choosing the obstacle enclosing boundary. The 2D object boundaries of obstacles include mesh vertices joined by line segments. Such type of paths is common in robotics and computer graphics. The output of typical robot motion planners is a path consisting of continuous straight-line segments between waypoints. Such a path is not differentiable at the waypoints. Since the robot has non-zero mass and the forces that can be applied are finite, the robot cannot instantaneously change its direction of motion. In order to follow the path precisely, it would have to come to a complete stop at each of the waypoints leading to slow execution. One standard method of avoiding a complete stop at the waypoints is that of adding parabolic blends. This is shown in FIG. 12 (at a). In other words, parabolic blends are used to smoothen an irregular path for a robot to follow. In this case, a similar problem is observed, except that the path around an obstacle is closed. Thus, the idea in T. Kunz et al., "Turning Paths Into Trajectories Using Parabolic Blends," *Georg. Inst. Technol.* (2011) is used to smoothen the closed irregular path around the obstacle using an ellipse. A parabola is a special case of an ellipse, with eccentricity e>1. Similarly, a circle is also a special case of an ellipse with eccentricity e=0 as shown in FIG. 12 (at b). Thus, an ellipse-based solution to map $f_{OR}$: $A_o \rightarrow A_r$ gives a smooth path around the obstacle for $A_r$, which can then be followed by $A_a$. There is also a specific type of ellipse known as the John-Lowner ellipse, which is the minimum area ellipse can be used to enclose any set of vertices as shown in FIG. 13 (at a). There are two types of John-Lowner ellipses. One that can be inscribed onto a n-shaped polygon object known as the inner ellipse and another that can be circumscribed onto the polygon as shown in FIG. 13 (at b). For enclosing an obstacle the circumscribed ellipse is required. Since the Lower ellipse is the minimum area ellipse that can enclose a given set of vertex points, and the area of an ellipse being proportional to its circumference, it reduces the distance the avatar must locomote around the obstacle. This minimizes the lag between $A_o$ and $A_a$ when $A_o$ exits the obstacle boundary.

Remote/Local AR Locomotion Mapping Setup using Ellipse for Obstacle Avoidance

Figure 14:
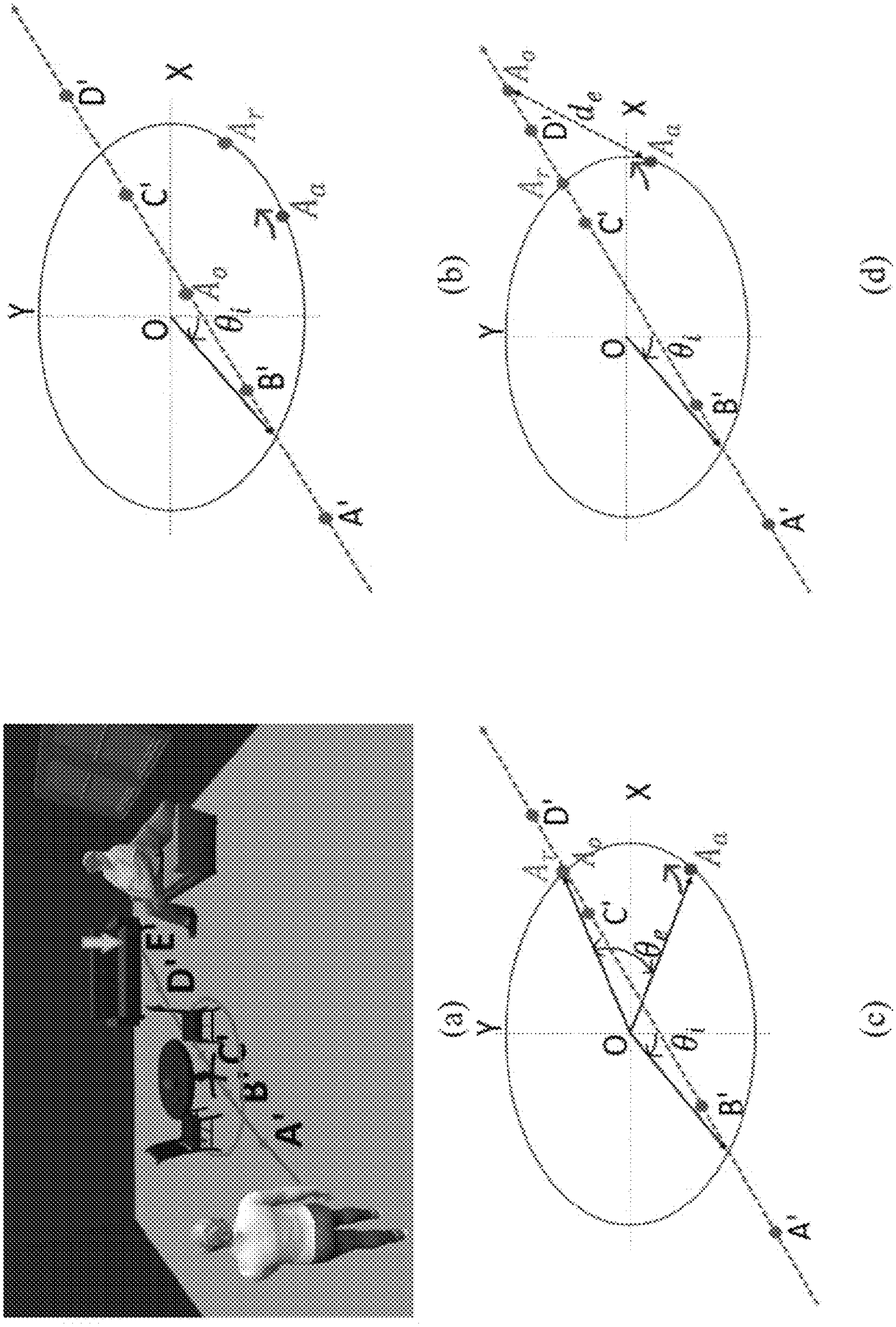
FIG. 14 illustrates a sample setup of a remote/local AR locomotion mapping scenario using ellipse-based obstacle avoidance (a) shows the avatar's room with the obstacle enclosed with the John-Lowner ellipse. (b)-(d) show the scenario in (a) on a XY plane when (b) $A_o$ is inside the ellipse (c) when $A_o$ is on the circumference, exiting the ellipse and (d) when $A_o$ has exited the ellipse and is on the equivalent path $E_Q$ A'B'C'D'E' outside of the ellipse.

The setup of a remote/local AR locomotion mapping scenario using ellipse-based obstacle avoidance is shown in FIG. 14. The definitions of $A_o$, $A_r$ and $A_a$ are the same as explained previously, with the only difference being that they are now mapped on to an ellipse circumference rather than an irregular obstacle boundary. FIG. 14 shows three cases as $A_o$ passes through and exits the ellipse. FIG. 14 (at b) shows the case when $A_o$ is present inside the ellipse. $\theta_i$ is defined as the entry angle at which the equivalent path ($E_Q$) A'B'C'D'E' enters the ellipse. In the subsequent figures, $E_Q$ is represented as a red dotted line. FIG. 14 (at c) shows the case when $A_o$ is on the circumference, exiting the ellipse. The exit error, $\theta_e$, is defined as the smaller angle made between the lines joining the center of the ellipse to $A_o$ and $A_a$. This metric is used to compare different mapping representations of $f_{OR}$: $A_o \rightarrow A_r$. FIG. 14 (at d) shows the case when $A_o$ has exited the ellipse and is on the $E_Q$ outside of the ellipse. The exit distance error $d_e$ as shown in FIG. 14 (at d) gets carried over to the trajectory planning framework discussed above, that takes over the locomotion mapping once $A_o$ has exited the ellipse.

Representations of Mapping from Interior of the Ellipse to its Circumference

The goal of a mapping representation $f_{OR}$: $A_o \rightarrow A_r$ is to reduce discontinuities in the path of $A_r$, which usually occur when $A_o$ crosses quadrants inside of the ellipse. The exit error $\theta_e$ should also be minimized as it adds an extra exit distance value $d_e$ to the trajectory planning framework. When mapping $f_{OR}$: $A_o \rightarrow A_r$, a 2 degree of freedom (DoF) is transferred to a 1 DoF representation. Hence there are many points inside the ellipse that map to the same points on its circumference causing singularities in the representation. The goal is to find a representation that reduces the singularities and discontinuities for the mapping $f_{OR}$: $A_o \rightarrow A_r$ to reduce $\theta_e$.

Figure 15:
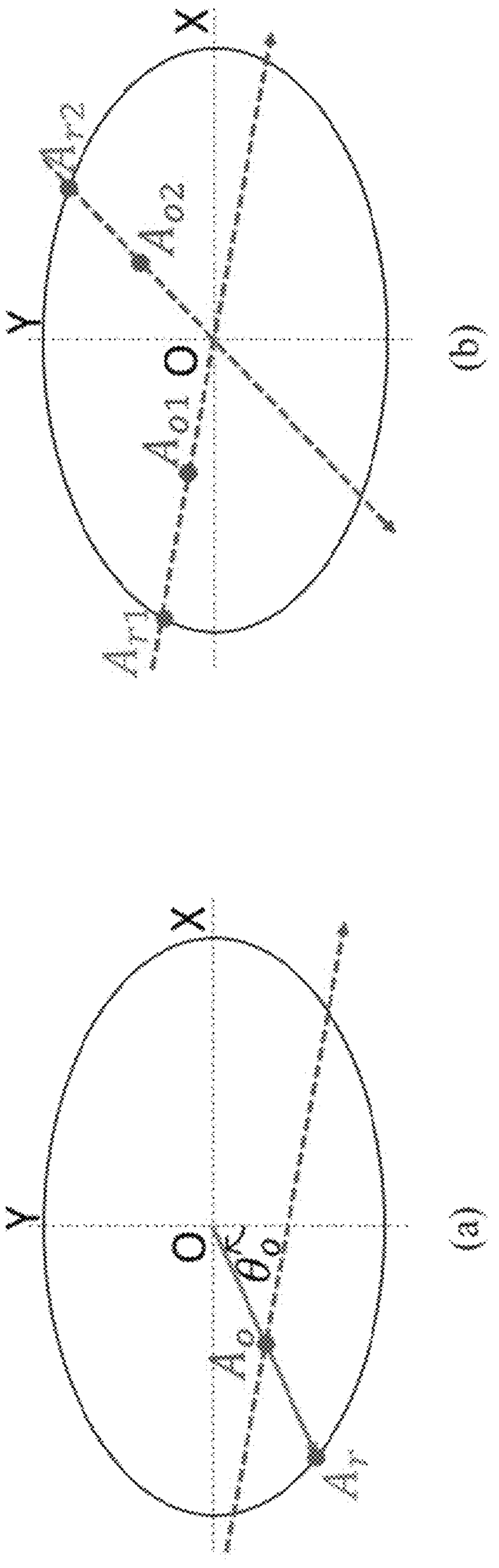
FIG. 15 illustrate (a) radial projection of the avatar's interior position $A_o$ to its circumference as $A_r$. (b) Paths that pass through the center of the ellipse are singularities of the radial projection method.

Radial projection along the circumference of the ellipse. The standard method to project a 2D position from the interior of the ellipse to its circumference is along the radius from the center, passing through the 2D position (FIG. 15 (at a)). This is called the radial projection method. Its position along the ellipse can be given as:

$$A_r(x_r, y_r) = (r_e \sin\theta_o, r_e \cos\theta_o) \quad \text{(eq. 11)}$$

where $r_e$ is the radius of the ellipse at $\theta_o$. The radial projection works well when the equivalent path $E_Q$ passes through adjacent quadrants near the circumference of the ellipse where it is continuous and uniform rather than opposite quadrants near the center of the ellipse where it is discontinuous and non-uniform. This is not desirable for $A_a$ and $A_e$ as it will increase $\theta_e$ when $A_o$ exits the ellipse. When using the radial projection, if the equivalent path $E_Q$ passes exactly through the center of the ellipse, then $A_r$ is a singularity. This is shown in FIG. 15 (at b). However, equivalent paths that pass near the center of the ellipse are very common, especially if the obstacle is in the center of the room as shown in FIG. 14 (at a). In most rooms, generally a majority of the furniture is present either at the corners or at the center of the room. Furniture at the corners usually does not occlude equivalent paths. However, if the furniture/obstacle is present in the center as shown in FIG. 14 (at a), then there are many paths that are near the center of the ellipse causing the radial projection to perform poorly. Hence a new representation of mapping $f_{OR}$: $A_o \rightarrow A_r$ is required. This representation should perform as well as the radial projection for paths that pass through adjacent quadrants near the circumference and have lower $\theta_e$ than the radial projection for paths that cross to opposite quadrants near the center of the ellipse. In order to achieve this, the radial projection method has been augmented with the details discussed below.

Augmented 2D Radial (A2R) Projection Method

Figure 16:
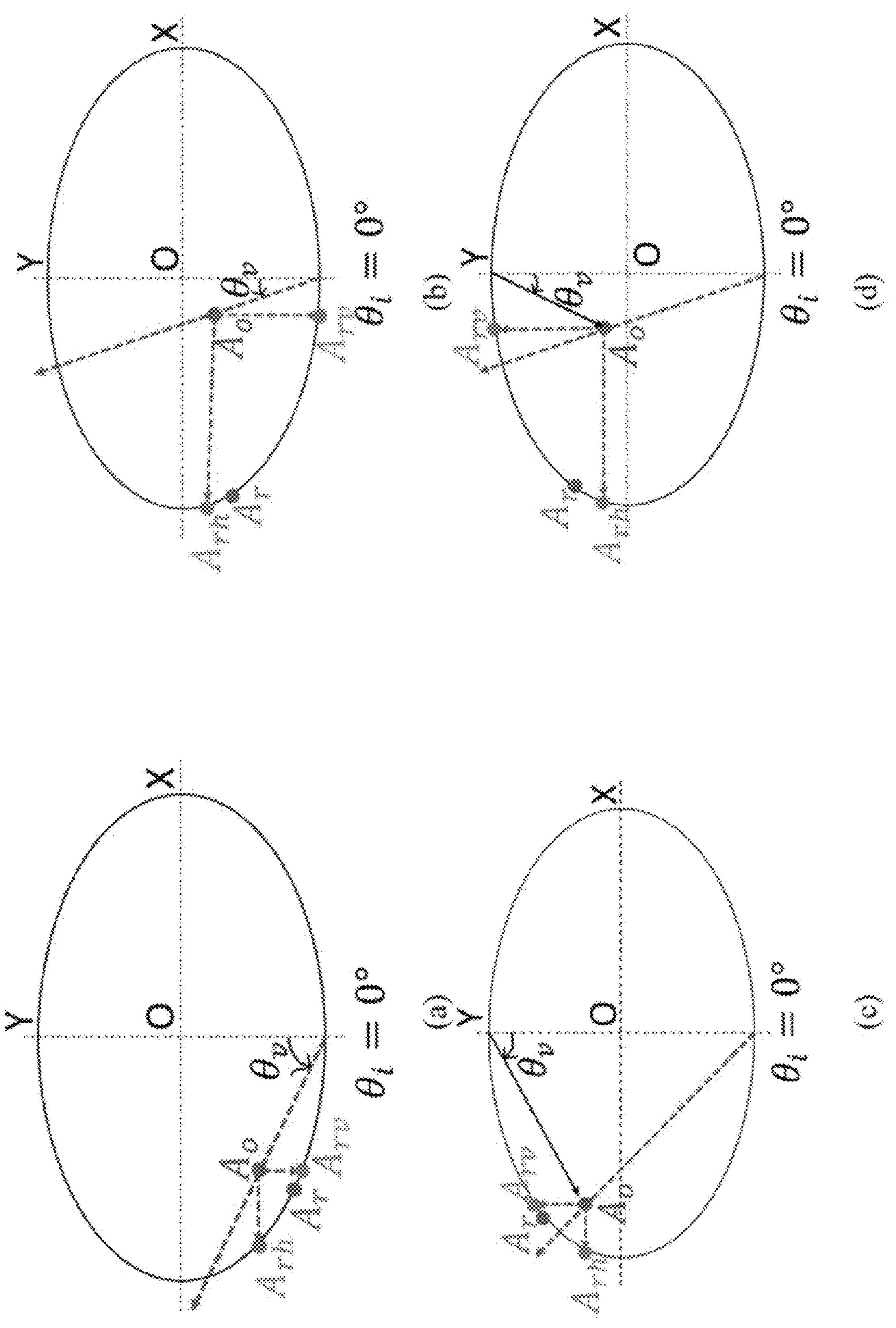
FIG. 16 show aspects of the A2R projection. It has two components, i.e., the horizontal and vertical components, $A_{rh}$ and $A_{rv}$, that are used to find the avatar's boundary reference position $A_r$. (a) and (c) show the proposed projection for paths that pass near the circumference of the ellipse. (b) and (d) show the proposed projection for path that passes near the center of the ellipse. Note that reference point for calculating the angle $\theta_v$ to $A_o$ is the nearest semi-minor axis on the ellipse circumference, which is the start of the semi-minor axis for the lower two quadrants ((a) and (b)) and the end of the semi-minor axis for the upper two quadrants ((c) and (d)).
Figure 17:
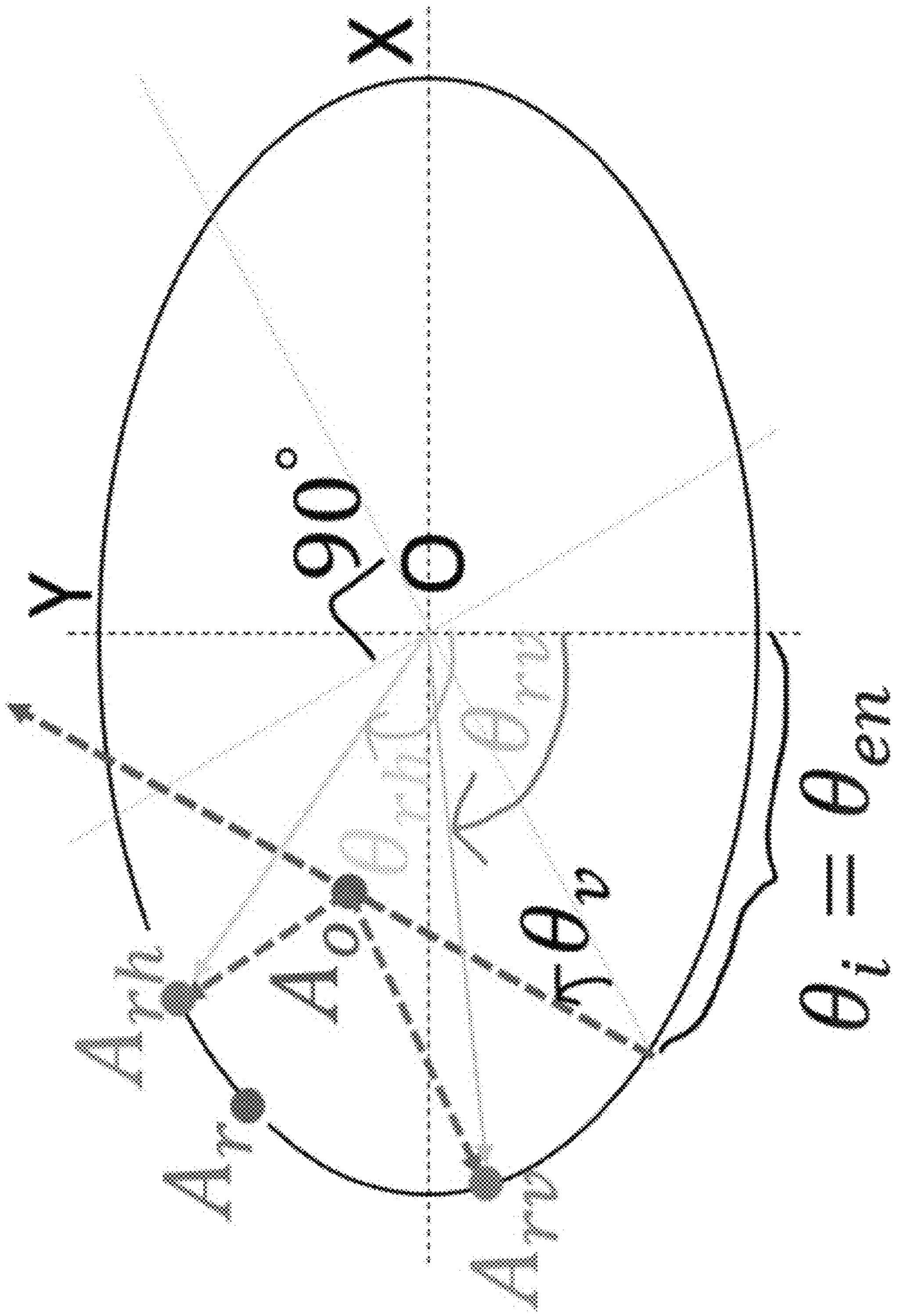
FIG. 17 illustrates the axis of reference for calculating $A_{rh}$, $A_{rv}$, $A_r$ and $\theta_v$ of the proposed A2R approach is shifted by an amount equal to the entry angle $\theta_i=\theta_{en}$ of the equivalent path.

A goal with the new mapping function for: $f_{OR}$: $A_o \rightarrow A_r$, which is called augmented 2D radial (A2R) projection, is to improve upon the drawbacks of the radial projection mapping method. In A2R projection, rather than having a single projection, $A_r$ of $A_o$ along the radius, two projections $A_{rh}$ and $A_{rv}$, are present both perpendicular to each other as shown in FIG. 16. The lines from $A_o$ to $A_{rh}$ and $A_{rv}$ are parallel to the semi-major and minor axes, respectively, when the entry angle is $\theta_i$=0 as shown in FIG. 16. If the entry angle $\theta_i$ is another value $\theta_n$, then the reference axis for calculation of $A_{rh}$ and $A_{rv}$ is shifted by $\theta_n$ in the clockwise direction as shown in FIG. 16. $\theta_v$ is a parameter of the A2R projection and as shown in FIGS. 16 and 10 is the angle $A_o$ makes with the vertical semi-minor axis. The reference point for calculating the angle $\theta_v$ from, is the nearest semi-minor axis on the ellipse circumference. $\theta_v$ varies as $A_o$ moves along the equivalent path, changing the position of $A_r$. The angular values of $A_{rh}$ and $A_{rv}$ can be denoted as Orh and Ory respectively as shown in FIG. 17. The resultant position of $A_r$ from $A_{rh}$ and $A_{rv}$ is calculated as follows:

$$A_r(x_r, y_r) = (r_e \sin\theta_r, r_e \cos\theta_r) \quad \text{(eq. 12)}$$

where $r_e$ is the radius of the ellipse at $\theta_r$ which is the angular value of $A_r$ calculated as follows:

$$\theta_r = \frac{\theta_{rv}\theta_v}{\frac{\pi}{2}} + \theta_{rh}\left(\frac{\frac{\pi}{2} - \theta_v}{\frac{\pi}{2}}\right) \quad \text{(eq. 13)}$$

The above calculation of $\theta_r$ causes the resultant position of the avatar $A_r$ to be towards Arv if the equivalent path pass through adjacent quadrants near the circumference of the ellipse (FIG. 16 (at a and c)) and towards $A_{rh}$ if the equivalent path crosses to the opposite quadrants nearer to the center of the ellipse (FIG. 16 (at b and d)). In this way, the A2R method is able to adapt to both types of equivalent paths and reduce the exit error $\theta_y$. The A2R method does have singularities and discontinuities, but their path is more complex and atypical of equivalent paths generated by user walking.

Method

The goal is to test the A2R projection against the radial projection for various patterns of equivalent paths passing through the ellipse. The paths were generated and tested using the Unity game engine. An autonomous agent is used to simulate $A_o$ moving along the equivalent path in a straight line as humans mostly walk. The setup for the paths is discussed below.

Straight Line Equivalent Paths

Figure 18:
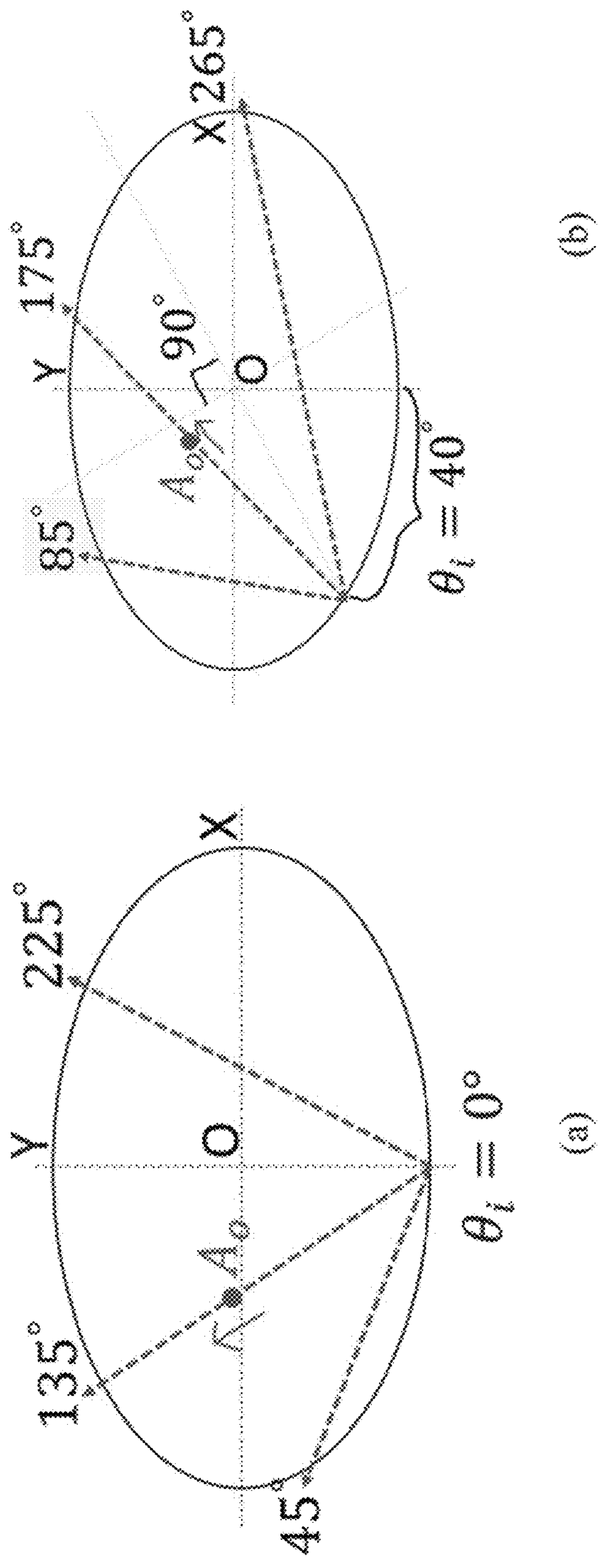
FIG. 18 illustrates a simulation setup for testing the proposed A2R vs radial projection approach for straight line paths. (a) shows an example case of exit angles when the path entry angle $\theta_i=0°$. (b) shows how the exit angles are adjusted when $\theta_i=\theta_{en}$ which is 40° in this case.

As discussed above, humans tend to walk in patterns that minimize energy usage. Most often this involves taking the shortest path and walking in straight lines. A majority of the time this results in the equivalent paths for $A_o$ also being straight lines. The simulation setup is shown in FIG. 18, where an autonomous agent simulating movement of $A_o$ follows the straight-line paths. As shown in FIG. 18 (at a), the agent enters the ellipse at $\theta_i$ and exits at angles specified according to the tested ranges. Three angular ranges, i.e. 0°-360°, 90°-270° and 150°-210°, were tested. The angular ranges were selected to simulate various cases of the paths passing across adjacent quadrants near the circumference of the ellipse to across opposite quadrants near the center. For each of these ranges, the exit angles for the agent are incrementing in 10° clockwise intervals. For example, for the angular range 0°-360°, the agent starts at $\theta_i$ and exits at 10°. The exit error $\theta_e$ is recorded for 10°. The agent then reverts back to $\theta_i$ and this time exits at 20° and so on. Once all the exit angles in the angular range have been traversed, the average exit error, $\theta_{eavg}$, is calculated for that testing angular range. The same process was repeated using the radial projection. The $\theta_{eavg}$ between the A2R and radial projection approach for various angular ranges were compared. $\theta_{eavg}$ for different path entry angles $\theta_i$ of 20°, 40°, 60°, and 80° were also calculated. The testing angular ranges and exit angles were adjusted accordingly as shown in FIG. 18 (at b). Only the first quadrant angles were chosen for testing various path entry angles $\theta_i$ due to the symmetric nature of the ellipse, as similar results were obtained when the initial entry angles were tested from other quadrants. Ellipses of various eccentricities 0.8, 0.6, 0.4, and 0.2 were also tested to simulate obstacles for various shapes and sizes.

Preliminary Results

The results of the average exit error Deavg values for the A2R and radial projections are shown in Tables 1-6. Each of the tables show the results for various eccentricities and testing angular ranges with different path entry angles $\theta_i$. As can be seen from the Tables, the A2R approach has a lower $\theta_{eavg}$ than the radial projection in almost all the categories.

TABLE 1

Comparison of the average exit error $\theta_{eavg}$ for A2R vs radial projection with straight line equivalent paths of entry angle $\theta_e$ = 0°

| Eccentricity | Tested angle range (°) | Radial projection $\theta_{eavg}$ (°) | A2R projection $\theta_{eavg}$ (°) | % reduction in $\theta_{eavg}$ − A2R vs radial (°) |
|---|---|---|---|---|
| 1 | 0-360 | 7.43 | 1.66 | 77.64 |
| | 90-270 | 13.38 | 2.73 | 79.59 |
| | 150-210 | 32.20 | 5.48 | 82.97 |

TABLE 1

Comparison of the average exit error $\theta_{eavg}$ for A2R vs radial projection with straight line equivalent paths of entry angle $\theta_e$ = 0°

| Eccentricity | Tested angle range (°) | Radial projection $\theta_{eavg}$ (°) | A2R projection $\theta_{eavg}$ (°) | % reduction in $\theta_{eavg}$ − A2R vs radial (°) |
|---|---|---|---|---|
| 0.8 | 0-360 | 18.09 | 11.01 | 39.16 |
| | 90-270 | 28.94 | 16.35 | 43.52 |
| | 150-210 | 59.21 | 27.11 | 54.21 |
| 0.6 | 0-360 | 27.90 | 24.43 | 12.41 |
| | 90-270 | 42.07 | 35.97 | 14.48 |
| | 150-210 | 76.46 | 47.47 | 37.91 |
| 0.4 | 0-360 | 35.45 | 33.88 | 4.43 |
| | 90-270 | 49.63 | 46.94 | 5.42 |
| | 150-210 | 85.84 | 79.64 | 7.22 |
| 0.2 | 0-360 | 41.25 | 40.63 | 1.52 |
| | 90-270 | 51.48 | 50.44 | 2.02 |
| | 150-210 | 87.80 | 85.58 | 2.53 |

TABLE 3

Comparison of the average exit error $\theta_{eavg}$ for A2R vs radial projection with straight line equivalent paths of entry angle $\theta_e$ = 20°

| Eccentricity | Tested angle range (°) | Radial projection $\theta_{eavg}$ (°) | A2R projection $\theta_{eavg}$ (°) | % reduction in $\theta_{eavg}$ – A2R vs radial (°) |
|---|---|---|---|---|
| 0.8 | 30-10 | 15.87 | 9.27 | 41.59 |
| | 110-290 | 28.497 | 16.33 | 42.70 |
| | 170-230 | 58.89 | 27.48 | 53.34 |
| 0.6 | 30-10 | 24.83 | 19.35 | 22.07 |
| | 110-290 | 44.06 | 33.85 | 23.17 |
| | 170-230 | 77.67 | 58.86 | 24.22 |
| 0.4 | 30-10 | 31.92 | 29.18 | 8.58 |
| | 110-290 | 54.21 | 48.65 | 10.26 |
| | 170-230 | 91.84 | 81.41 | 11.36 |
| 0.2 | 30-10 | 43.39 | 41.79 | 3.69 |
| | 110-290 | 61.07 | 57.3 | 6.17 |
| | 170-230 | 96.51 | 91.22 | 5.48 |

TABLE 4

Comparison of the average exit error $\theta_{eavg}$ for A2R vs radial projection with straight line equivalent paths of entry angle $\theta_e$ = 40°

| Eccentricity | Tested angle range (°) | Radial projection $\theta_{eavg}$ (°) | A2R projection $\theta_{eavg}$ (°) | % reduction in $\theta_{eavg}$ – A2R vs radial (°) |
|---|---|---|---|---|
| 0.8 | 50-30 | 14.01 | 4.68 | 66.60 |
| | 130-310 | 25.05 | 7.77 | 68.98 |
| | 190-250 | 51.73 | 12.64 | 75.57 |
| 0.6 | 50-30 | 25.13 | 16.54 | 34.18 |
| | 130-310 | 42.6 | 27.12 | 36.34 |
| | 190-250 | 70.66 | 43.91 | 37.86 |
| 0.4 | 50-30 | 36.55 | 32.34 | 11.52 |
| | 130-310 | 54.34 | 47.42 | 12.73 |
| | 190-250 | 83.26 | 73.12 | 12.18 |
| 0.2 | 50-30 | 57.36 | 57.28 | 0.13 |
| | 130-310 | 69.59 | 68.06 | 2.20 |
| | 190-250 | 92.96 | 89.37 | 3.86 |

TABLE 5

Comparison of the average exit error $\theta_{eavg}$ for A2R vs radial projection with straight line equivalent paths of entry angle $\theta_e$ = 60°

| Eccentricity | Tested angle range (°) | Radial projection $\theta_{eavg}$ (°) | A2R projection $\theta_{eavg}$ (°) | % reduction in $\theta_{eavg}$ – A2R vs radial (°) |
|---|---|---|---|---|
| 0.8 | 70-50 | 10.15 | 2.94 | 71.03 |
| | 150-330 | 18.05 | 4.52 | 74.96 |
| | 210-270 | 39.58 | 6.23 | 84.26 |
| 0.6 | 70-50 | 21.52 | 7.59 | 64.71 |
| | 150-330 | 33.31 | 9.41 | 71.74 |
| | 210-270 | 45.85 | 12.23 | 73.33 |
| 0.4 | 70-50 | 37.63 | 28.50 | 24.27 |
| | 150-330 | 50.22 | 36.07 | 28.18 |
| | 210-270 | 61.29 | 40.05 | 34.65 |
| 0.2 | 70-50 | 63.79 | 63.18 | 0.95 |
| | 150-330 | 79.57 | 78.84 | 0.91 |
| | 210-270 | 80.00 | 75.88 | 5.15 |

TABLE 6

Comparison of the average exit error $\theta_{eavg}$ for A2R vs radial projection with straight line equivalent paths of entry angle $\theta_e$ = 80°

| Eccentricity | Tested angle range (°) | Radial projection $\theta_{eavg}$ (°) | A2R projection $\theta_{eavg}$ (°) | % reduction in $\theta_{eavg}$ – A2R vs radial (°) |
|---|---|---|---|---|
| 0.8 | 90-70 | 6.567 | 2.25 | 65.74 |
| | 170-350 | 11.51 | 3.31 | 71.24 |
| | 230-290 | 28.34 | 4.47 | 84.23 |
| 0.6 | 90-70 | 7.45 | 1.99 | 73.30 |
| | 170-350 | 11.60 | 1.87 | 83.89 |
| | 230-290 | 21.70 | 2.89 | 86.69 |
| 0.4 | 90-70 | 20.24 | 4.88 | 75.89 |
| | 170-350 | 24.89 | 2.37 | 90.49 |
| | 230-290 | 25.12 | 2.02 | 91.97 |
| 0.2 | 90-70 | 52.18 | 36.11 | 30.79 |
| | 170-350 | 64.76 | 39.06 | 39.69 |
| | 230-290 | 61.34 | 17.26 | 71.86 |

Various features of the disclosure are set forth in the following claims.

What is claimed is:

1. A system to map the locomotion of a first user and a second user at remote locations interacting in collaborative augmented reality (AR), the system comprising:

a first head mounted display (HMD) configured to be worn by the first user, the first user positioned within a first environment that includes a first interactable surface and a first obstacle;

a second HMD configured to be worn by the second user, the second user positioned within a second environment that includes a second interactable surface and a second obstacle, wherein the second HMD is communicably coupled to the first HMD, the second HMD configured to generate a path for an avatar of the first user in the second environment by:

generating a two-dimensional (2D) spatial mesh of the first environment based on sensor data collected by the first HMD, deforming the 2D spatial mesh of the first environment to a spatial configuration of the second environment to generate an equivalent path in the second environment, taking into account the first interactable surface and the first obstacle in the first environment and the second interactable surface and the second obstacle in the second environment, generating a path through the deformed 2D spatial mesh of the first environment based on the sensor data tracking motion of the first user in the first environment, and providing the path for the avatar of the first user to follow and that can be viewed by the second user through the second HMD.

2. The system of claim 1, wherein the 2D spatial mesh is generated by:

generating a three-dimensional (3D) mesh of the first environment based on the sensor data;

determining a plurality of mesh vertex boundary points for the first interactable surface, the first obstacle, and boundaries of the first environment;

determining 2D boundaries of the first interactable surface, the first obstacle, and the boundaries of the first environment by interpolating between the mesh vertex boundary points; and classifying each component of the 2D spatial mesh as walkable, non-walkable interactable surface, and an obstacle.

3. The system of claim 2, wherein the 2D boundaries of the first interactable surface and the first obstacle are determined on a 2D plane using an orthographic projection of the 3D vertices of the first interactable surface and the first obstacle onto the 2D plane, and wherein the plurality of mesh vertex boundary points is determined from the orthographic projection.

4. The system of claim 2, wherein when generating the path, the mesh vertex boundary points are transferred to the corresponding side in the second environment and scaled according to the dimensions of the second environment.

5. The system of claim 1, wherein the second HMD is configured to display the avatar of the first user following the generated path in the second environment.

6. The system of claim 5, wherein the path is generated for the avatar of the first user to conform to naturistic walking constraints through the second environment.

7. The system of claim 6, wherein a velocity profile of the avatar is spatially and temporally synchronized, based on a trajectory planning method, with the motion of the first user in the first environment.

8. The system of claim 5, wherein if the first obstacle includes an irregular shape in the path of the avatar in the second environment, the path for the avatar to follow is modified around the first obstacle in a manner that avoids abrupt changes in direction.

9. The system of claim 8, wherein the path around the first obstacle in the second environment is determined by fitting 2D boundaries around the first obstacle with a minimum area ellipse.

10. The system of claim 9, wherein the minimum area ellipse is a John Lowner ellipse allowing minimal, but a smooth deviation around the first obstacle.

11. The system of claim 10, wherein a projection of a reference path of the first user to the avatar's path around the John Lowner ellipse is such that it reduces a distance between the first user and a position of the avatar of the first user, when the first user path exits the first obstacle.

12. The system of claim 5, wherein if the first obstacle appears on the path of the first user in the first environment, with the first user navigating through the first obstacle, the path of the avatar of the first user in the second environment is modified such that the path avoids abrupt changes in direction in the second environment.

13. The system of claim 1, wherein the spatial configuration of the second environment includes boundaries of the second interactable surface and the second environment, and wherein deforming the 2D spatial mesh of the first environment to the spatial configuration of the second environment includes finding a correspondence between boundaries of the first interactable surface in the first environment to the second interactable surface in the second environment based on a non-rigid transformation algorithm.

14. The system of claim 13, wherein the non-rigid transformation algorithm comprises a non-rigid Iterative Closest Point (ICP) algorithm.

15. The system of claim 1, wherein the motion of the user in the first environment is recording, in the sensor data, using barycentric coordinates.

16. The system of claim 1, wherein the 2D spatial mesh is generated in real-time using shader codes.

17. The system of claim 1, wherein the 2D spatial mesh is generated using a triangulation technique.

18. The system of claim 1, wherein the 2D spatial mesh comprises a Delaunay mesh.

19. The system of claim 1, wherein a 2D spatial mesh of the first environment is deformed to the spatial configuration of the second environment.

20. The system of claim 1, wherein the path of the avatar is generated based on the path of the first user for any irregularly-shaped room, obstacle, or interactable surface boundaries.

* * * * *